United States Patent
Gong et al.

(10) Patent No.: US 10,362,649 B2
(45) Date of Patent: Jul. 23, 2019

(54) LED LIGHTING DEVICE

(71) Applicant: LUMENS CO., LTD., Yongin-si, Gyeonggi-do (KR)

(72) Inventors: Myeong-Kook Gong, Yongin-si (KR); Kyung Ho Yoo, Yongin-si (KR); Kil Ho Choo, Suwon-si (KR); Jong Il Kim, Uiwang-si (KR); Young June Lee, Yongin-si (KR); Seung Jong Han, Seoul (KR); Yong-Wook Cho, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 15/876,448

(22) Filed: Jan. 22, 2018

(65) Prior Publication Data

US 2018/0146521 A1    May 24, 2018

Related U.S. Application Data

(63) Continuation of application No. 15/245,538, filed on Aug. 24, 2016, now Pat. No. 9,918,363, which is a
(Continued)

(30) Foreign Application Priority Data

Feb. 5, 2013 (KR) .................. 10-2013-0012835
May 20, 2013 (KR) .................. 10-2013-0056432
(Continued)

(51) Int. Cl.
*H05B 33/08* (2006.01)
*H05B 37/02* (2006.01)

(52) U.S. Cl.
CPC ....... *H05B 33/083* (2013.01); *H05B 33/0815* (2013.01); *H05B 33/0845* (2013.01);
(Continued)

(58) Field of Classification Search
CPC .............. H05B 33/083; H05B 33/0815; H05B 33/0845; H05B 33/0854
See application file for complete search history.

(56) References Cited

U.S. PATENT DOCUMENTS

| | | | |
|---|---|---|---|
| 2003/0117087 A1* | 6/2003 | Barth ................. | H05B 33/0815 315/291 |
| 2013/0320868 A1* | 12/2013 | Kim ................... | H05B 33/0824 315/186 |
| 2015/0181659 A1* | 6/2015 | Kang ................. | H05B 33/0809 315/186 |

* cited by examiner

*Primary Examiner* — Seokjin Kim
(74) *Attorney, Agent, or Firm* — Mei & Mark LLP

(57) ABSTRACT

The purpose of the present invention is to reduce heat generated through a switching IC circuit in order to protect a switching IC circuit by connecting a resistor to an LED unit in which a plurality of LEDs are connected so as to disperse heat in the resistor when a rated voltage or more is inputted. To this end, the LED lighting device comprises: a rectification circuit unit for receiving input power from a power source unit and outputting a rectified power; an LED unit having a plurality of LED channels connected in series and a resistor unit connected to the last end of the LED channels; a current sensing resistor; and a switch circuit unit comprising a plurality of switches, wherein an nth switch is connected to the rear end of an nth LED channel so as to control an operation of the nth LED channel and is controlled by a sum of a current of the nth switch and a current of an (n+1)th switch, which flows through the current sensing resistor.

20 Claims, 30 Drawing Sheets

Related U.S. Application Data continuation of application No. 14/765,610, filed as application No. PCT/KR2014/000998 on Feb. 5, 2014, now Pat. No. 9,491,825.

(30) Foreign Application Priority Data

| | | |
|---|---|---|
| May 20, 2013 | (KR) | 10-2013-0056433 |
| May 20, 2013 | (KR) | 10-2013-0056435 |
| May 20, 2013 | (KR) | 10-2013-0056436 |
| May 20, 2013 | (KR) | 10-2013-0056437 |
| Jul. 18, 2013 | (KR) | 10-2013-0084812 |
| Jul. 18, 2013 | (KR) | 10-2013-0084813 |
| Jul. 18, 2013 | (KR) | 10-2013-0084814 |
| Jul. 18, 2013 | (KR) | 10-2013-0084815 |
| Jul. 18, 2013 | (KR) | 10-2013-0084816 |
| Aug. 22, 2013 | (KR) | 10-2013-0099825 |

(52) U.S. Cl.
 CPC ..... *H05B 33/0854* (2013.01); *H05B 37/0227* (2013.01); *H05B 33/0812* (2013.01); *Y02B 20/341* (2013.01)

(a)

(b)

(a)

(b)

LED LIGHTING DEVICE

This is a continuation of U.S. application Ser. No. 15/245,538, filed Aug. 24, 2016, which is a continuation of U.S. application Ser. No. 14/765,610, filed on Aug. 4, 2015, now U.S. Pat. No. 9,491,825, which is a National Stage Application of PCT International Application No. PCT/KR2014/000998, filed Feb. 5, 2014, which claims the priority benefits to Korean Patent Application Nos. 10-2013-0012835, filed Feb. 5, 2013, 10-2013-0056432, filed May 20, 2013, 10-2013-0056433, filed May 20, 2013, 10-2013-0056435, filed May 20, 2013, 10-2013-0056436, filed May 20, 2013, 10-2013-0056437, filed May 20, 2013, 10-2013-0084812, filed Jul. 18, 2013, 10-2013-0084813, filed Jul. 18, 2013, 10-2013-0084814, filed Jul. 18, 2013, 10-2013-0084815, filed Jul. 18, 2013, 10-2013-0084816, filed Jul. 18, 2013, and 10-2013-0099825, filed Aug. 22, 2013. The contents of the above-listed applications are incorporated herein by reference in their entirety.

TECHNICAL FIELD

Background Art

An LED diode (hereinafter, it is referred to "LED") is used in lighting devices to satisfy requirements of low power consumption, high efficiency, and long lifetime.

In order to use an LED as a light source, a switching circuit to operate the LED according to an input voltage is necessary.

A conventional switching circuit includes a voltage sensing circuit or period sensing circuit to sense the amount of a voltage or an input period of a voltage, thereby controlling a switch corresponding to an LED. Since the conventional switching circuit includes the voltage sensing circuit or the period sensing circuit, its entire size is too big. Thus, the marginal area to include more LEDs is reduced.

In addition, the switching circuit is formed by a FET, and the FET IC is a sensitive component, and very weak to heat. Herein, when an input voltage equal to or greater than a rated voltage is inputted, a significant amount of heat may generate at the switching circuit. That is, when the input voltage equal to or equal to or greater than the rated voltage is inputted, current with high amperes flows through the switching circuit, thereby generating a significant amount of heat at the switching circuit.

In U.S. Pat. No. 6,989,807, in an AC (alternating current) input voltage having real time voltage change, LEDs are operated under the real time voltage change condition by controlling a plurality of switches connected in parallel to a plurality of the LEDs connected in series. However, since a voltage sensing circuit sensing the input voltage is included in U.S. Pat. No. 6,989,807, an area for mounting more LEDs decreases, and a significant amount of heat generates at the switching circuit when a voltage equal to or greater than the rated voltage is inputted, thereby increasing power consumption, reducing its efficiency, and increasing occurrence of malfunctions of the circuit due to the significant amount of heat generated at the switching circuit.

DETAILED DESCRIPTION OF THE INVENTION

Technical Problem

The present invention has an objective to decrease the heat generation at a switch unit and protect the switch unit by generating heat at a resistor to distribute the heat generation when a voltage equal to or greater than the rated voltage is inputted to an LED unit in which a plurality of LEDs are connected.

The present invention has an objective to form a switch unit without any input voltage sensing circuit or any input period sensing circuit sensing an input voltage, thereby adding additional LEDs can be added in a restricted area.

The present invention has an objective to prevent a flicker phenomenon by connecting a capacitor to an LED.

The present invention has an objective to economically control dimming of LEDs.

Other objectives of the present invention can be easily understood by the description of following embodiments.

Technical Solution

According to an aspect of the present invention, an LED lighting device, including: a power source unit supplying an input power; a rectification circuit unit for receiving input power from the power source unit and outputting a rectified power; an LED unit having a plurality of LED channels connected in series and a resistor unit connected to the last end of the LED channels; a current sensing resistor; and a switch circuit unit including a plurality of switches, wherein an $n^{th}$ switch is connected to the rear end of an $n^{th}$ LED channel so as to control an operation of the LED channel, and is controlled by a sum of a current of the $n^{th}$ switch and a current of an $(n+1)^{th}$ switch, which flows through the current sensing resistor.

Herein, a resistor unit may be connected to the last LED channel, the switch circuit unit may include a switch connected to the resistor unit, and then the resistor unit may distribute and decrease heat generating at the switch circuit unit.

Herein, the LED channel may include one or more LEDs.

Herein, the $n^{th}$ LED channel may have a different forward voltage Vf so as to reduce the power consumption at the $n^{th}$ switch.

Herein, a saturation current of the $(n-1)^{th}$ switch may be set greater than a saturation current of the $n^{th}$ switch.

Herein, a voltage applied to the current sensing resistor may be changed by a sum of a current flowing through the $n^{th}$ switch and a current flowing through the $(n+1)^{th}$ switch adjacent to the $n^{th}$ switch. When the input voltage is equal to or greater than the forward voltage Vf of the $(n+1)^{th}$ LED channel to flow a saturation current through the $(n+1)^{th}$ switch, the $n^{th}$ switch may turn off.

Herein, the LED lighting device further may include a plurality of LED operation units. Each of the LED operation units may include the rectifier circuit unit, the LED unit, the current sensing resistor, and the switch circuit unit. Each of the plurality of the LED operation units may be connected in parallel to the power source unit.

Herein, the plurality of the LED operation units may include a rectifier circuit unit which outputs a same or different voltage according to the input power of the same power source unit.

Herein, the LED unit may be formed as blocks and the LED lighting device may have a matrix connection structure. The LED lighting device may further include a block connection unit to form a specific connection structure when the LED unit formed as the blocks are connected.

Herein, the LED lighting device further include a plurality of the LED units each formed as blocks which are connected in parallel.

Herein, the LED channel may be formed as a block having one or more LEDs.

Herein, the LED unit may include capacitors, each connected in parallel to each of the LED channels. Furthermore, the capacitor may supply a voltage to the LED channel connected in parallel, when the input voltage is inputted as a voltage with which the LED channels connected in parallel are not operated.

Herein, the LED lighting device may further include, a current control unit comprising a temperature sensor, which measures temperature of the switch circuit unit, and controlling a current flowing through the switch circuit unit according to the temperature of the switch circuit unit. Furthermore, a malfunction temperature may be set in the current control unit. The current control unit may protect the switch circuit unit through current control with which the switches are controlled so as not to flow a current through the switch circuit unit, when the temperature of the switch circuit unit is equal to or greater than the malfunction temperature.

Herein, the LED lighting device may further include: a switch circuit current blocking unit connected in series to the resistor unit for sensing and blocking a current, which flows through the switch circuit unit. Furthermore, a stable operation current value with which the switch circuit unit is stably operated may be set in the switch circuit current blocking unit. When the current flowing through the switch circuit current blocking unit is greater than the stable operation current value, the switch circuit current blocking unit may block the switch through the current flows among the switches in the switch circuit unit to block a current flowing through the switch circuit unit.

Herein, the LED lighting device may further include: a current conversion switch positioned between the resistor unit and the last switch for blocking the current, which flows through the switch circuit unit; and a current blocking control unit for controlling the current conversion switch, when an over-current flows through the switch circuit unit, to block the current flowing through the switch circuit unit. Furthermore, a stable operation current value with which the switch circuit unit may be stably operated is set in the current blocking control unit. When the current flowing through the switch circuit unit is greater than the stable operation current value, the current blocking control unit may control the current conversion switch to block a current flowing through the switch circuit unit.

According to another aspect of the present invention, an LED lighting device, including: a rectification circuit unit for receiving an input power from a power source unit and outputting a rectified power; an LED unit having a plurality of LED channels connected in series and a resistor unit connected to the last end of the LED channels; a dimming control unit comprising a variable resistor for controlling the current flowing through the LED unit to control dimming of the LED channel; and a switch circuit unit comprising a plurality of switches, wherein an $n^{th}$ switch is connected to the rear end of an $n^{th}$ LED channel so as to control an operation of the LED channel, and is controlled by a sum of a current of the $n^{th}$ switch and a current of an $(n+1)^{th}$ switch, which flows through the variable resistor.

Herein, the dimming control unit may further include a dimming control switch. The dimming control unit may perform dimming control by changing the resistance value of the variable resistor with the switch to control the operating number of the LED channel of the LED unit. In addition, the dimming control unit may further include a dimming control switch. The dimming control unit may perform dimming control by changing the resistance value of the variable resistor with the switch to control the current value flowing through the LED channel of the LED unit.

According to another aspect of the present invention, an LED lighting device, including: a rectification circuit unit for receiving an input power from a power source unit and outputting a rectified power; a charge storage circuit unit, receiving power from the rectifier circuit unit, storing charges at a high voltage, and outputting the stored charges at low voltage; an LED unit having a plurality of LED channels connected in series and a resistor unit connected to the last end of the LED channels; a current sensing resistor; and a switch circuit unit comprising a plurality of switches, wherein an $n^{th}$ switch is connected to the rear end of an $n^{th}$ LED channel so as to control an operation of the LED channel, and is controlled by a sum of a current of the $n^{th}$ switch and a current of an $(n+1)^{th}$ switch, which flows through the current sensing resistor.

Herein, the charge storage circuit unit may include a first condenser, a second condenser, a first diode, a second diode, and a third diode. The second diode may be connected in a forward direction between the first condenser and the second condenser, an end of the first condenser may be connected to a power source voltage node of the rectifier circuit unit, an end of the second condenser may be connected to a ground, the first diode may be connected in a backward direction between a ground and a node to which the first condenser and the second diode are connected, and the third diode may be connected between the LED unit and a node to which the second condenser and the second diode are connected. The charge storage circuit unit may output the stored charges to supply a voltage to the LED unit when a voltage outputted from the rectifier circuit unit is lower than a voltage stored in the charge storage circuit unit.

According to another aspect of the present invention, an LED lighting device, including: a rectification circuit unit for receiving an input power from a power source unit and outputting a rectified power; a ripple elimination circuit unit, receiving the input power, storing charges, and outputting the stored charges to output ripple eliminated power when the input power decreases; an LED unit having a plurality of LED channels connected in series and a resistor unit connected to the last end of the LED channels; a current sensing resistor: and a switch circuit unit comprising a plurality of switches, wherein an $n^{th}$ switch is connected to the rear end of an $n^{th}$ LED channel so as to control an operation of the LED channel, and is controlled by a sum of a current of the $n^{th}$ switch and a current of an $(n+1)^{th}$ switch, which flows through the current sensing resistor.

Herein, the ripple elimination circuit unit may include a resistor and a capacitor, and output the charges stored in the capacitor when the input power decreases.

Advantageous Effects

According to some embodiment of the present invention, the LED lighting device includes a resistor end distributing heat of the switch unit so as to prevent the excessive heat generation at the switch unit, when a voltage equal to or greater than the rated voltage is inputted. Therefore, the LED lighting device provides an effect of maintaining the normal operation of the switch unit formed of IC.

In addition, according to some embodiment of the present invention, since the forward voltage of the LED channel is redistributed, the LED lighting device provides effects of decrease in the power consumption at the switch unit and efficiency increase.

In addition, according to some embodiment of the present invention, the LED lighting device provides an effect that the dimming control is performed by controlling the operation number of the LED or the operation current of the LED by using the variable resistor.

In addition, according to some embodiment of the present invention, the LED lighting device provides an effect of providing a constant brightness by the reduction of a flicker phenomenon caused by the input voltage.

In addition, according to some embodiment of the present invention, the LED lighting device provides an effect of the protection of the switch unit by blocking an over-current flowing through the switch unit.

DESCRIPTION OF REFERENCE NUMERALS

Figure 1:
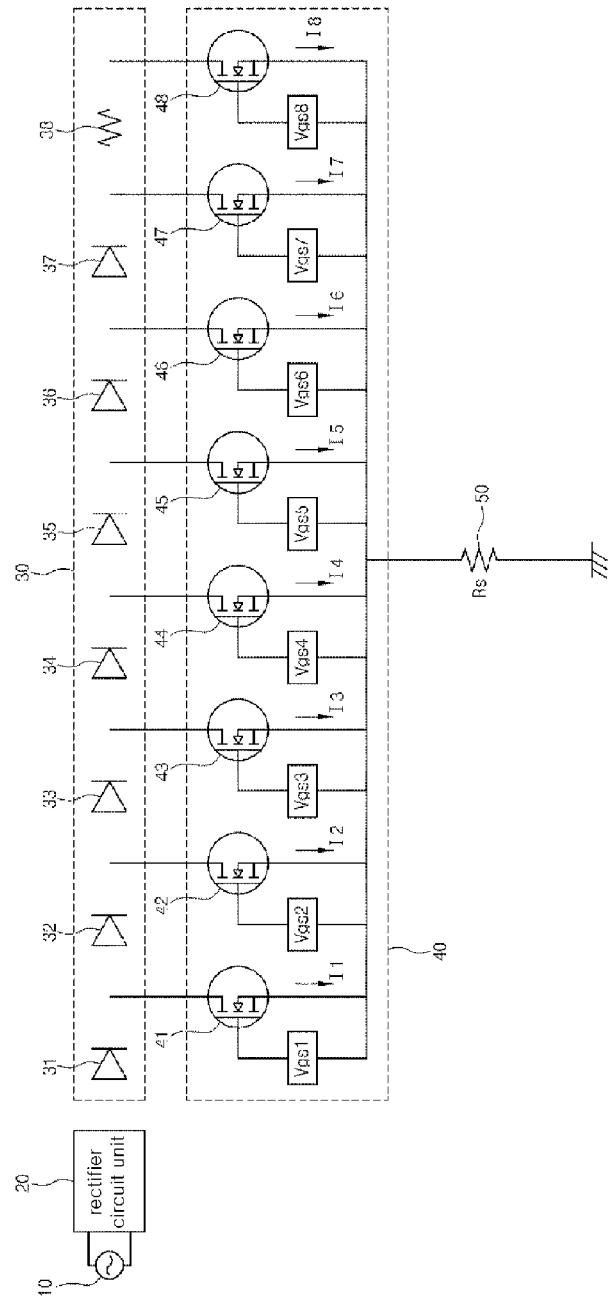
FIG. 1 is a diagram showing a structure of a lighting device reducing the heat generation at a switch unit, when a voltage equal to or greater than a rated voltage is inputted, according to some embodiment of the present invention.

10: power source unit 20: rectifier circuit unit
30: LED unit 31, 32, 33, 34, 35, 36, 37: LED channel
38: resistor unit
40: switch unit
41, 42, 43, 44, 45, 46, 47, 48: switch
50: current sensing resistor

BEST MODE

Hereinafter, the present invention will now be described more fully with reference to the accompanying drawings, in which exemplary embodiments of the invention are shown. While the present invention has been particularly shown and described with reference to exemplary embodiments thereof, it will be understood by those of ordinary skill in the art that various changes in form and details may be made therein without departing from the spirit and scope of the present invention. However, the present invention is not limited by the embodiments described later, but realized with various aspects. The embodiments in this description will make the disclosures of the present invention complete, and provide the scope of the invention to those of ordinary skill in the art.

The terminology used herein is for the purpose of describing particular embodiments only and is not intended to be limiting of the present invention. It will be understood that the terms first, second, third, etc., are only used to distinguish one component from another component. In addition, the singular forms "a," "an" and "the" are intended to include the plural forms as well, unless the context clearly indicates otherwise.

Hereinafter, embodiments of the present invention will be described in detail with reference to accompanying drawings.

FIG. 1 is a diagram showing a structure of a lighting device reducing the heat generation at a switch unit, when a voltage equal to or greater than a rated voltage is inputted, according to some embodiment of the present invention.

The lighting device of the present invention includes a rectifier circuit unit 20, an LED unit 30, a switch unit 40 and a current sensing resistor 50.

An the power source unit 10 supplies an input power. The rectifier circuit unit 20 receives the input power from the power source unit 10, rectifies the input power, and outputs a rectified power.

The LED unit 30 includes n LED channels connected in series, and a resistor unit 38 is connected to the last end of the last LED channel.

In FIG. 1, for example, the LED unit 30 includes 7 LED channels 31, 32, 33, 34, 35, 36, 37. The resistor unit 38 is connected to an end next to the last LED channel 37 among the LED channels connected each other in series.

The switch unit 40 includes n+1 switches to operate the LED channels according to the input power source. Herein, the n switches among the n+1 switches controls the operations of the LED channels according to the input power source, and the $(n+1)^{th}$ switch operates the resistor unit 38.

In FIG. 1, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The fifth LED channel 35 and the fourth switch 44 are connected to an end next to the fourth LED channel 34. The six LED channel 36 and the fifth switch 45 are connected to an end next to the fifth LED channel 35. The seventh LED channel 37 and the sixth switch 46 are connected to an end next to the sixth LED channel 36. The resistor unit 38 and the seventh switch 47 are connected to an end next to the seventh LED channel 37. The eighth switch 48 is connected to an end next to the resistor unit 38.

Herein, each of the switches consists of a FET (Field Effect Transistor), for example, a NMOS FET.

The current sensing resistor 50 is connected to each of the switches 41, 42, 43, 44, 45, 46, 47, 48 included in the switch unit 40. Thus, when currents flow through the switches, the current flowing through the current sensing resistor 50 is a sum of the currents flowing through the switches.

According to the present invention, the LED channels operate according to the amount of the input power source. A corresponding LED channel operates according to the amount of the rectified power source inputted the LED unit 30.

The operation of the switch unit 40 according to the present invention will be described.

Initially, an operation voltage is inputted to gates of all switches 41, 42, 43, 44, 45, 46, 47, 48 to operate each switch (that is, the current flows). Herein, the condition of $Vgs1<Vgs2<Vgs3<Vgs4<Vgs5<Vgs6<Vgs7$ is satisfied. Each of Vgs1, Vgs2, Vgs3, Vgs4, Vgs5, Vgs6, and Vgs7 is connected to the current sensing resistor 50 and affected by a voltage applied to the current sensing resistor 50.

Afterward, the switches in the switch unit 40 are automatically controlled by the voltage value applied to the current sensing resistor 50 according to the amount of the rectified voltage inputted in the LED unit 30, thereby operating the LED channels. In the present invention, a switching condition means that when current flows two adjacent switches, a voltage is generated at the current sensing resistor by a sum of the currents flowing through the two adjacent switches, the operation voltage decreases due to the voltage applied to the current sensing resistor, and then any switch having a lower operation voltage first turns off.

For example, the current sensing resistor is set for 10 ohm.

Table 1 shows saturation current values at the switches (FETs) and voltages applied to the current sensing resistor when the saturation current flows through switches.

Herein, "Id" indicates a saturation current of the corresponding switch. It indicates a saturation voltage when the switch operates and a current flows. "Vrs" indicates a voltage applied to the current sensing resistor.

TABLE 1

| | Id (mA) | Vrs |
|---|---|---|
| First FET | 20 | 0.2 |
| Second FET | 40 | 0.4 |
| Third FET | 60 | 0.6 |
| Fourth FET | 80 | 0.8 |
| Fifth FET | 100 | 1.0 |
| Sixth FET | 120 | 1.2 |
| Seventh FET | 140 | 1.4 |
| Eighth FET | 160 | 1.6 |

In addition, a forward voltage Vf of each LED channel is 30V.

In this case, when an input voltage increases to reach about 30V, the first LED channel 31 begins to operate and a current I1 begins to flow through the first switch 41. When the input voltage is equal to or greater than 30V, a saturation current of 20 mA flows through the first switch 41 and the voltage applied to the current sensing resistor becomes 0.2V.

When the input voltage increases to reach about 60V, the second LED channel 32 begins to operate and a current I2 gradually flows through the second switch 42. A current flowing through the current sensing resistor 50 is a sum of the current flowing through the first switch 41 of 20 mA and the current I2 flowing through the second switch 42. Thus, the voltage at the current sensing resistor 50 gradually increases. As the voltage applied to the current sensing resistor 50 increases, the voltage Vgs1 inputted to the gate of the first switch 41 becomes relatively lower, and thus the first switch 41 gets into the switching condition in which an on-state changes to an off-state. When the input voltage gradually increases to gradually increase the current I2 flowing through the second switch 42, the voltage applied to the current sensing resistor 50 gradually increases to lower the voltage value of Vgs1, and thus the first switch 41 becomes the off-state.

When the input voltage is equal to or greater than 60V, a saturation current of 40 mA flows through the second switch 42 and the first switch 41 is completely the off-state.

When the input voltage increases to reach about 90V, the third LED channel 33 begins to operate, a current I3 gradually flows through the third switch 43. Herein, a current flowing through the current sensing resistor 50 is a sum of the currents flowing through the second switch 42 of 40 mA and the current I3 flowing through the third switch 43. Thus, the voltage applied to the current sensing resistor 50 gradually increases. As the voltage applied to the current sensing resistor 50 increases, the voltage Vgs2 inputted to the gate of the second switch 42 becomes relatively lower, and thus the second switch 42 gets into the switching condition in which an on-state changes to an off-state. When the voltage value applied to the current sensing resistor 50 gradually increases to lower the voltage value of Vgs2, and thus the second switch 42 becomes the off-state.

When the input voltage is equal to or greater than 90V, a saturation current of 60 mA flows through the third switch 43, and the second switch 42 becomes completely the off-state.

As described above, when a current sequentially flows through a $(n+1)^{th}$ switch according to the input voltage, a $n^{th}$ switch becomes the off-state.

When the input voltage increases to reach about 210V, the seventh LED channel 37 begins to operate, and a current I7 and a current I8 gradually flow through the seventh switch 47 and the eighth switch 48, respectively. Herein, a current flowing through the current sensing resistor 50 is a sum of the currents flowing through the sixth switch 46 of 120 mA and the currents flowing through the seventh switch 47 and the eighth switch 48. Likewise, when the input voltage is equal to or greater than 210V, a saturation current of 140 mA flows through the seventh switch 47, and the sixth switch 46 becomes completely the off-state.

However, when the input voltage is equal to or greater than 210V and equal to or greater than the rated voltage, the seventh switch 47 becomes the off-state and only the eighth switch 48 operates because of the same reason.

Herein, in case that an LED is connected at the position of the resistor unit 38 instead of the resistor according to the conventional art, when the input voltage equal to or greater than the rated voltage is inputted, an over-current flows through the eighth switch 48, thereby generating a lot of heat. That is, an over-current flows through the switch operating the last LED channel. Thus, the generation of the overheating harmfully affects the switch unit 40 formed of IC components to cause a breakdown of the components and efficiency reduction due to the heat generation.

Thus, according to the present invention, since the resistor unit 38 is connected and the voltage is distributed to the resistor unit 38, when a voltage equal to or greater than the rated voltage is inputted, the heat generated at the eighth switch 48 is distributed to the resistor unit 38, thereby preventing the eighth switch 48 from overheating. In this way, according to the present invention, when the input voltage equal to or greater than the rated voltage is inputted, the switch unit 40 is not overheated, thereby providing the stability of the switch unit 40 formed of the IC.

In addition, according to the present invention, a capacitor may be connected between the rectifier circuit unit 20 and each of the LED channels 31, 32, 33, 34, 35, 36, 37, thereby preventing a flicker phenomenon.

Figure 2:
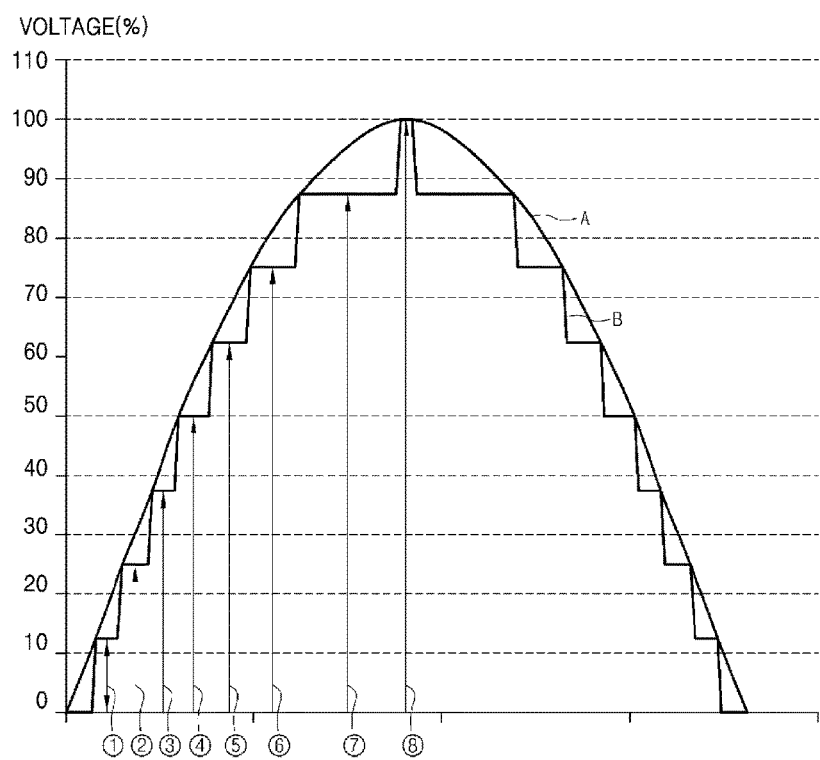
FIG. 2 is a diagram showing voltages applied to the positions of LED channels according to input voltages, according to some embodiment of the present invention.
Figure 3:
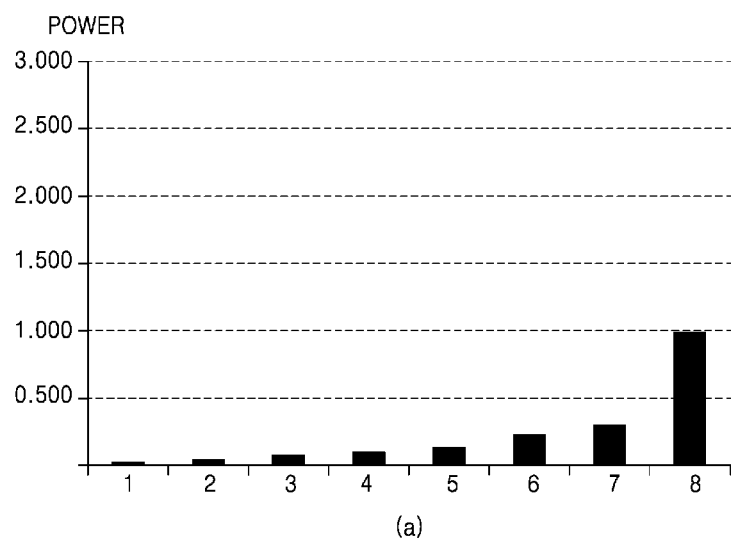
FIG. 3 is a diagram showing the power consumption at the switch unit, according to some embodiment of the present invention.
Figure 3:
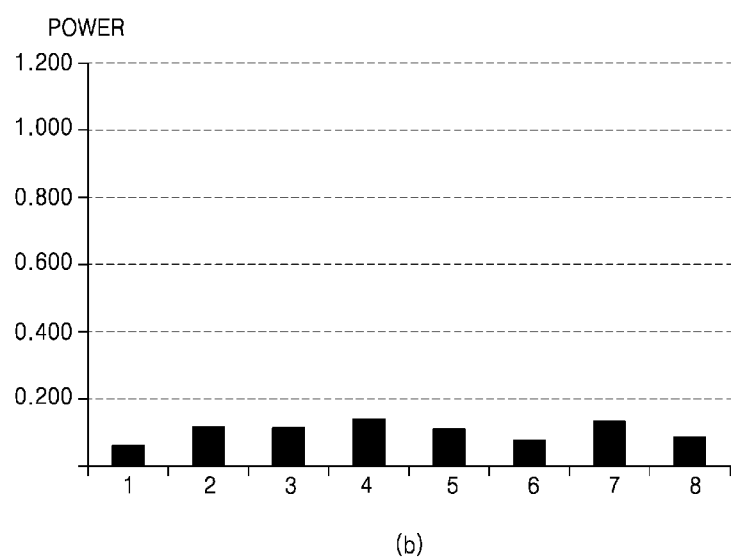

FIG. 2 is a diagram showing voltages applied to the positions of LED channels according to input voltages, according to some embodiment of the present invention. FIG. 3 is a diagram showing the power consumption at the switch unit, according to some embodiment of the present invention.

As shown in FIG. 2, the voltage of the LED unit 30 according to the input voltage A forms a step functional voltage B due to the forward voltage of each of the LED channels. Herein, "①" indicates the voltage applied to the LED unit 30 when the first LED channel operates. "②" indicates the voltage applied to the LED unit 30 when the second LED channel operates. "③" indicates the voltage applied to the LED unit 30 when the third LED channel operates. "④" indicates the voltage applied to the LED unit 30 when the fourth LED channel operates. "⑤" indicates the voltage applied to the LED unit 30 when the fifth LED channel operates. "⑥" indicates the voltage applied to the LED unit 30 when the sixth LED channel operates. "⑦" indicates the voltage applied to the LED unit 30 when the seventh LED channel operates. "⑧" indicates the voltage applied to the LED unit 30 when a current flows through the eighth switch.

Herein, when a voltage equal to or greater than the rated voltage (for example, a voltage greater than 110% or more of the input voltage) is inputted, the voltage applied to the LED unit 30 increases. When a voltage equal to or greater than the rated voltage is inputted, the voltage applied to the LED unit 30 increases, thereby a current flowing through the switch connected to the last end increases.

As the current increase, the power increases proportional to a square of the current.

FIG. 3 is a diagram showing power consumption at the switch unit 40 according to the operating LED channels, according to some embodiment of the present invention.

FIG. 3(a) is a diagram showing the power consumption at the switch unit 40 when the forward voltages of the LED channels are constant and an LED is connected instead of the resistor unit 38. "1" indicates the power consumption when a current flows through the first switch 41. "2" indicates the power consumption when a current flows through the second switch 42. "3" indicates the power consumption when a current flows through the third switch 43. "4" indicates the power consumption when a current flows through the fourth switch 44. "5" indicates the power consumption when a current flows through the fifth switch 45. "6" indicates the power consumption when a current flows through the sixth switch 46. "7" indicates the power consumption when a current flows through the seventh switch 47. "8" indicates the power consumption when a current flows through the eighth switch 48 and a voltage equal to or greater than the rated voltage is inputted.

From the first switch to the seventh switch, when the input voltage increases, the $n^{th}$ switch is operated by the remained voltage formed by subtracting the forward voltage at the $n^{th}$ LED channel. When the more voltage is inputted, the $n^{th}$ switch becomes the off-state and the $(n+1)^{th}$ switch operates, thereby increasing the power consumption (heat generation). However, the power consumption is within a range of no more than 0.3. When a voltage equal to or greater than the rated voltage is inputted, an excessive current flows through the eighth switch 48 (the last switch), and then the power consumption (heat generation) becomes greater than 1. Thus, when the voltage equal to or greater than the rated voltage is inputted, overheating occurs at the eighth switch 48.

According to the present invention, since the resistor unit 38 is included, heat can be generated at the resistor unit 38 when the voltage equal to or greater than the rated voltage is inputted, thereby reducing the heat generating at the eighth switch 48.

In addition, according to the present invention, the forward voltages Vf of the LED channels are unevenly redistributed, and then the power consumed at each switch becomes almost same. That is, the forward voltage Vf of the $(n+1)^{th}$ LED channel increases greater than the forward voltage Vf of the $n^{th}$ LED channel, and then the power consumption at the $n^{th}$ switch and the power consumption at the $(n+1)^{th}$ switch become almost same. By the redistribution of the forward voltages Vf of the LED channels, the heat generation at the switch unit 40 becomes same regardless of the change of the input voltage.

FIG. 3(b) is a diagram showing that the power consumption at the switch unit 40 is equal to or less than 0.2 by the redistribution of the forward voltages of each LED channel even when the input voltage increases. Herein, although the forward voltage Vf of each LED channel can be freely changed, the total amount of the forward voltages Vf is set according to the maximum value of the input voltage.

In addition, in FIG. 3(b), since the resistor unit 38 is included, the power consumption at the eighth switch 48 (the last switch) is same as that at other switches even when the input voltage is equal to or greater than the rated voltage.

The lighting device of the present invention described above has advantages as follows.

The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

Otherwise, in a modified example of this embodiment, a ghost light prevention resistor (not shown) can be included at the position of the first switch 41 after removing the first LED 31 in order to prevent the generation of ghost light. For example, a secondary lighting device, which provides weak light when an ON/OFF switch is off, can be added in order to the position of the ON/OFF switch of the LED lighting device. In case of no ghost light prevention resistor, there is a problem that the first LED 31 of the LED unit 30 may emit light through the emitting light path of the secondary lighting device even when the ON/OFF switch is off in case of no ghost light prevention resistor. To solve this problem, the first LED 31 is removed and a ghost light prevention resistor is added at the position of the first switch 41, thereby providing a current path through the ghost light prevention resistor and preventing the generation of ghost light. This type of the ghost light prevention structure can be similarly applied to following embodiments.

Figure 4:
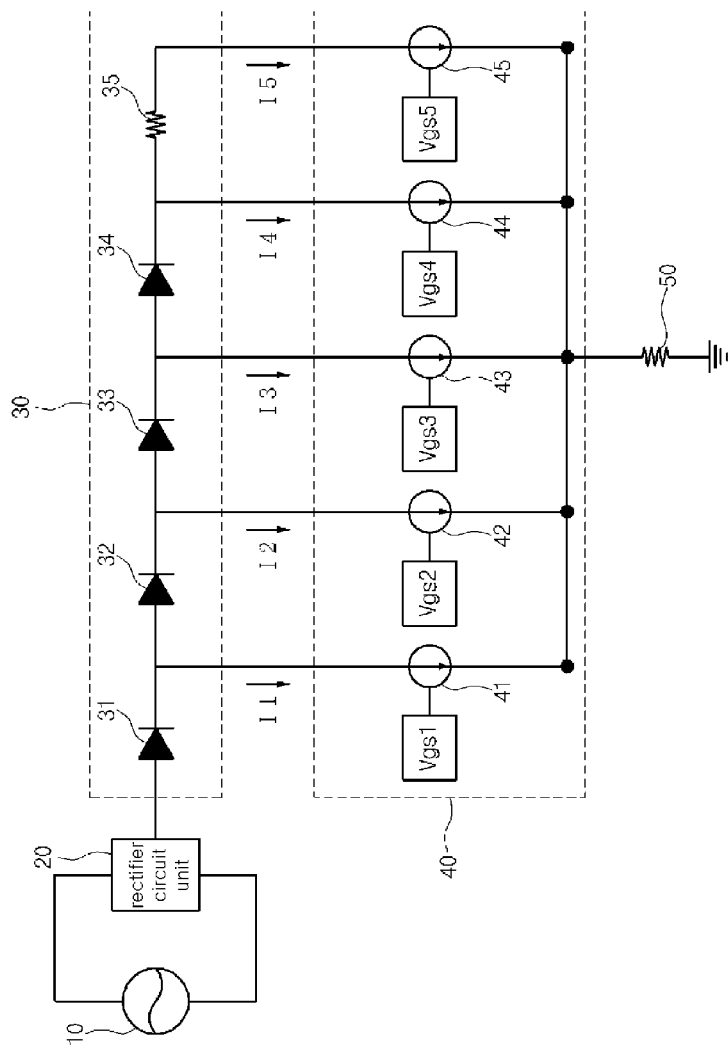
FIG. 4 is a diagram showing a structure of an LED lighting device having one LED operation unit, according to some embodiment of the present invention.

FIG. 4 is a diagram showing a structure of an LED lighting device having one LED operation unit, according to some embodiment of the present invention.

The power source unit 10 supplies the input power. Since the power source unit 10 uses an alternating current (AC) power source, the amount of the input voltage is periodically changed as time passes. The rectifier circuit unit 20 receives the AC input power from the power source unit 10, rectifies the input power, and outputs a rectified power.

The LED operation unit includes the LED unit 30, the switch unit 40, and the current sensing resistor 50. The LED unit 30 receives the power from the rectifier circuit unit 20 to perform the operation. The plurality of the LED channels are connected in series, and a resistor unit 35 is connected to a lower portion of the last LED channel.

Hereinafter, the present invention will be described with an assumption of n=4 for easy description.

The switch unit 40 includes a plurality of the switches 41, 42, 43, 44, 45. The $n^{th}$ switch is connected to the rear end of the $n^{th}$ LED channel so as to control an operation of the LED channel. The $n^{th}$ switch is controlled by a sum of a current of the $n^{th}$ switch and a current of the $(n+1)^{th}$ switch, which flows through the current sensing resistor 50.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

In FIG. 4, for example, the second LED channel 32 and the first switch 41 is connected to an end next to the first LED channel 31. The third LED channel 33 and the second switch 42 is connected to an end next to the second LED channel 32. The fourth LED channel 34 and the third switch 43 is connected to an end next to the third LED channel 33. The resistor unit 35 and the fifth switch 44 is connected to an end next to the fourth LED channel 34. The fifth switch 45 is connected to an end next to the resistor unit 35.

Herein, each of the switches consists of a FET (Field Effect Transistor), for example, a NMOS FET.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

The current sensing resistor 50 may consist of a variable resistor.

According to the present invention, the LED channels operate according to the amount of the input power source. A corresponding LED channel operates according to the amount of the rectified power source inputted the LED unit 30.

The operation of the switch unit 40 according to the present invention will be described.

Initially, an operation voltage is inputted to gates of all switches 41, 42, 43, 44, 45 to operate each switch (that is, the current flows).

Herein, an operation voltage of the first switch 41 is Vgs1, an operation voltage of the second switch 42 is Vgs2, an operation voltage of the third switch 43 is Vgs3, an operation voltage of the fourth switch 44 is Vgs4, and an operation voltage of the fifth switch 45 is Vgs5.

Herein, the condition of Vgs1<Vgs2<Vgs3<Vgs4<Vgs5 is satisfied.

Each of Vgs1, Vgs2, Vgs3, Vgs4, and Vgs5 is connected to the current sensing resistor 50 and affected by a voltage applied to the current sensing resistor 50.

Afterward, the switches in the switch unit 40 are automatically controlled by the voltage value applied to the current sensing resistor 50 according to the amount of the rectified voltage inputted in the LED unit 30, thereby operating the LED channels.

In the present invention, a switching condition means that when current flows two adjacent switches, a voltage is generated at the current sensing resistor by a sum of the currents flowing through the two adjacent switches, the operation voltage decreases due to the voltage applied to the current sensing resistor, and then any switch having a lower operation voltage first turns off.

Afterward, the switches in the switch unit 40 are automatically controlled by the voltage value applied to the current sensing resistor 50 according to the amount of the rectified voltage inputted in the LED unit 30, thereby operating the LED channels.

In the present invention, for example, the current sensing resistor 50 is set for 10 ohm.

Table 2 shows saturation current values at the switches (FETs) and voltages applied to the current sensing resistor when the saturation current flows through switches.

Herein, "Id" indicates a saturation current of the corresponding switch. It indicates a saturation voltage when the switch operates and a current flows. "Vrs" indicates a voltage applied to the current sensing resistor.

TABLE 2

|  | Id (mA) | Vrs |
| --- | --- | --- |
| First FET | 20 | 0.2 |
| Second FET | 40 | 0.4 |
| Third FET | 60 | 0.6 |
| Fourth FET | 80 | 0.8 |
| Fifth FET | 100 | 1.0 |

In addition, a forward voltage Vf of each LED channel is 50V.

In this case, when the input voltage increases to reach about 50V, the first LED channel 31 begins to operate and a current I1 gradually flows through the first switch 41. When the input voltage is equal to or greater than 50V, a saturation current of 20 mA flows through the first switch 41 and the voltage applied to the current sensing resistor 50 becomes 0.2V.

When the input voltage increases to reach about 100V, the second LED channel 32 begins to operate and a current I2 gradually flows through the second switch 42. A current flowing through the current sensing resistor 50 is a sum of the currents flowing through the first switch 41 of 20 mA and the current I2 flowing through the second switch 42. Thus, the voltage applied to the current sensing resistor 50 gradually increases. As the voltage applied to the current sensing resistor 50 increases, the voltage Vgs1 inputted to the gate of the first switch 41 becomes relatively lower, and thus the first switch 41 gets into the switching condition in which an on-state changes to an off-state. When the input voltage gradually increases to gradually increase the current I2 flowing through the second switch 42, the voltage applied to the current sensing resistor 50 gradually increases to relatively lower the voltage value of Vgs1, and thus the first switch 41 becomes the off-state.

When the input voltage is equal to or greater than 100V, a saturation current of 40 mA flows through the second switch 42 and the first switch 41 is completely the off-state.

When the input voltage increases to reach about 150V, the third LED channel 33 begins to operate, a current I3 gradually flows through the third switch 43. Herein, a current flowing through the current sensing resistor 50 is a sum of the currents flowing through the second switch 42 of 40 mA and the current I3 flowing through the third switch 43. Thus, the voltage applied to the current sensing resistor 50 gradually increases. As the voltage applied to the current sensing resistor 50 increases, a voltage Vgs2 inputted to the gate of the second switch 42 becomes relatively lower, and thus the second switch 42 gets into the switching condition in which an on-state changes to an off-state. When the voltage value applied to the current sensing resistor 50 gradually increases to relatively lower the voltage value of Vgs2, and thus the second switch 42 becomes the off-state.

When the input voltage is equal to or greater than 150V, a saturation current of 60 mA flows through the third switch 43, and the second switch 42 becomes completely the off-state.

As described above, when a current sequentially flows through a $(n+1)^{th}$ switch according to the input voltage, a $n^{th}$ switch becomes the off-state.

When the input voltage increases to reach about 200V, the fourth LED channel 34 begins to operate, and the current I3 and a current I4 gradually flow through the third switch 43 and the fourth switch 44, respectively. Herein, a current flowing through the current sensing resistor 50 is a sum of the currents flowing through the third switch 43 of 60 mA and the currents flowing through the fourth switch 44 and the fifth switch 45.

Likewise, when the input voltage is greater than 200V, a saturation current of 80 mA flows through the fourth switch 44, and the third switch 43 becomes completely the off-state.

However, when the input voltage equal to or greater than the rated voltage is inputted (for example, the voltage of about 250V), the fourth switch 44 becomes the off-state and only the fifth switch 48 operates because of the same reason.

Herein, in case that an LED is connected at the position of the resistor unit 35 instead of the resistor according to the conventional art, when the input voltage equal to or greater than the rated voltage is inputted, an over-current flows through the eighth switch 45, thereby generating a lot of heat. That is, an over-current flows through the switch operating the last LED channel. Thus, the generation of the overheating harmfully affects the switch unit 40 formed of IC components to cause a breakdown of the components and efficiency reduction due to the generation of the heat.

Thus, according to the present invention, since the resistor unit 35 is connected to the last end of the LED unit 30 and the voltage is distributed at the resistor unit 35, when a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

In addition, the present invention has distinguishable features according to the power consumption.

From the first switch to the fourth switch, when the input voltage increases, the $n^{th}$ switch is operated by the remained voltage formed by subtracting the forward voltage at the $n^{th}$ LED channel. When more voltage is inputted, the $n^{th}$ switch becomes the off-state and the $(n+1)^{th}$ switch operates so as to increase the power consumption (heat generation). However, the total power consumption is within a specific system standard range. When a voltage equal to or greater than the rated voltage is inputted, an excessive current flows through the fifth switch 45 (the last switch), and then the power consumption (heat generation) becomes greater than the system standard range. Thus, when the voltage equal to or greater than the rated voltage is inputted, overheating occurs at the fifth switch 45.

According to the present invention, since the resistor unit 35 is included, heat can be generated at the resistor unit 35, even when the voltage equal to or greater than the rated voltage is inputted, thereby reducing the heat generating at the fifth switch 45.

In addition, according to the present invention, the forward voltages Vf of the LED channels are unevenly redistributed, and then the power consumed at each switch becomes almost same. That is, the forward voltage Vf of the $(n+1)^{th}$ LED channel increases greater than the forward voltage Vf of the $n^{th}$ LED channel, and then the power consumption at the $n^{th}$ switch and the power consumption at the $(n+1)^{th}$ switch become almost same. By the redistribution of the forward voltages Vf of the LED channels, the heat generation at the switch unit 40 becomes same regardless of the change of the input voltage.

Herein, although the forward voltage Vf of each LED channel can be freely changed, the total amount of the forward voltages Vf is set as the maximum value of the input voltage.

Figure 5:
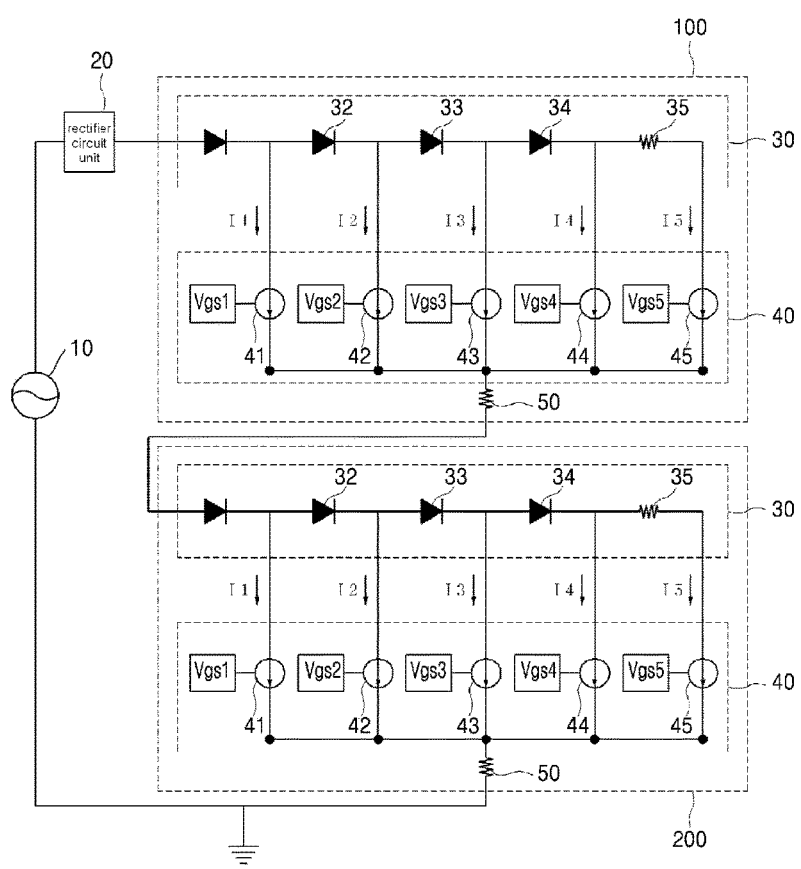
FIG. 5 is a diagram showing a structure in which LED operation units are connected in series, according to some embodiment of the present invention.

FIG. 5 is a diagram showing a structure in which LED operation units are connected in series, according to some embodiment of the present invention.

According to the present invention, LED operation units are connected in series, as shown in FIG. 5.

FIG. 5 shows an LED lighting device includes two LED operation units 100, 200 connected each other in series.

Each of the LED operation units 100, 200 includes the LED unit 30, the switch unit 40 and the current sensing resistor 50, as shown in FIG. 4.

As shown in FIG. 5, when the LED operation units 100, 200 are connected in series, the maximum voltage of the input voltage is Vmax. When the LED units in the first LED operation unit 100 and the second LED operation unit 200 use LEDs having the same forward voltages Vf, the first LED operation unit 100 performs its switching operation under a voltage within a range of (½) times Vmax of the input voltage, and the second LED operation unit 200 performs its switching operation under a voltage equal to or greater than (½) times Vmax of the input voltage.

When the maximum value of the input voltage is 220V and the input voltage is less than 110V, the LED unit 30 and the switch unit 40 in the first LED operation unit 100 performs the switching operation, as shown in FIG. 4.

That is, when the input voltage is from 110V to 220V, all LED channels in the first LED operation unit 100 operates to emit light, and the switching operation of the switch unit 40 and the operation of the LED unit 30 in the second LED operation unit 200 performs the switching operation, as shown in FIG. 4.

When LED units in the first LED operation unit 100 and the LED units in the second LED operation unit 200 use LEDs having different forward voltages Vf, the range of the input voltage operating each of LED operation units 100, 200 is changed according to the amount of the forward voltage Vf of each of the LED operation units 100, 200.

As shown in FIG. 5, when the LED operation units 100, 200 are connected in series, brightness becomes twice with the input voltage greater than a predetermined voltage, compared with using one LED operation unit LED operation unit.

Figure 6:
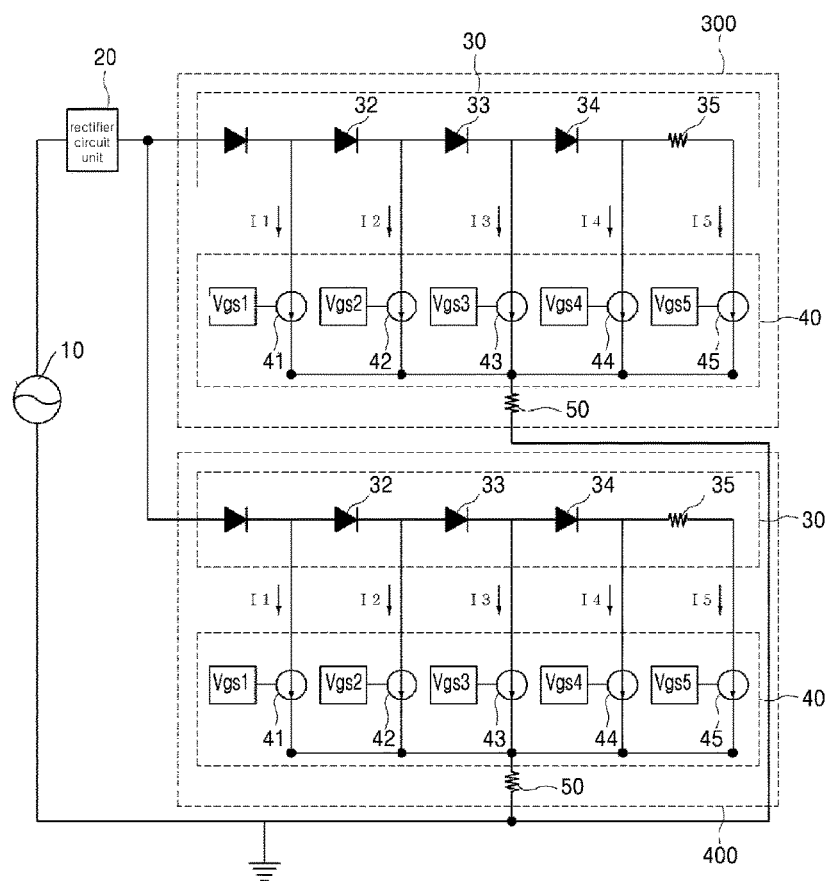
FIG. 6 is a diagram showing a structure in which LED operation units are connected in parallel, according to some embodiment of the present invention.

FIG. 6 is a diagram showing a structure in which LED operation units are connected in parallel, according to some embodiment of the present invention.

According to the present invention, LED operation units are connected in parallel, as shown in FIG. 6.

FIG. 6 shows an LED lighting device includes two LED operation units 300, 400 connected each other in parallel.

Each of the LED operation units 300, 400 includes the LED unit 30, the switch unit 40 and the current sensing resistor 50, as shown in FIG. 4. The switching operation of the switch unit 40 and the operation of the LED unit 30 in each of LED operation units 300, 400 are same as described in FIG. 4.

As shown in FIG. 6, when the LED operation units 300, 400 are connected in parallel, and LED units in the first LED operation unit 300 and the second LED operation unit 400 use LEDs having the same forward voltages Vf, the first LED operation unit 300 and the second LED operation unit 400 independently perform the same operation at the same amount of the input voltage according to the amount of the input voltage V.

That is, the switching operation of the LED unit 30 and the switch unit 40 in the first LED operation unit 300 and the switching operation of the LED unit 30 and the switch unit 40 in the second LED operation unit 400 are the same within the same range of the input voltage, as described in FIG. 4.

When LED units in the first LED operation unit 300 and the LED units in the second LED operation unit 400 has LEDs having different forward voltages Vf, the range of the input voltage operating each of the LED operation units 300, 400 is changed according to the amount of the forward voltage Vf of each of the LED operation units 300, 400.

As shown in FIG. 6, when the LED operation units 300, 400 are connected in parallel, brightness becomes twice with the input voltage greater than a predetermined voltage, compared with using one LED operation unit LED operation unit under the same power.

Figure 7:
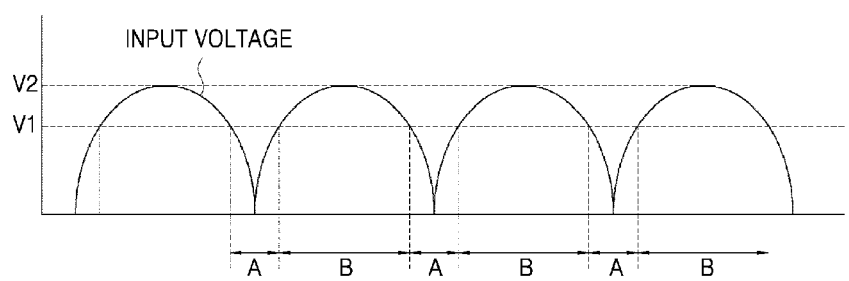
FIG. 7 is a diagram showing operation of an LED operation unit according to the amount of the input voltage, according to some embodiment of the present invention.

FIG. 7 is a diagram showing operation of an LED operation unit according to the amount of the input voltage, according to some embodiment of the present invention.

"V1" indicates an input voltage operating all LED channels in the first LED operation unit. "V2" indicates the maximum value of the input voltage.

As shown in FIG. 5, when the first LED operation unit 100 and the second LED operation unit 200 are connected in series, only the first LED operation unit 100 operates within V1 of the input voltage, as described in FIG. 4. When the input voltage is equal to or greater than V1, all of the LED channels of the LED unit 30 in the first LED operation unit 100 operates (emitting light), and the second LED operation unit 200 operates according to the amount of the input voltage, as described in FIG. 4.

Thus, in the section A, only the first LED operation unit 100 performs the switching operation, as described in FIG. 4, and then a corresponding LED channel operates according to the input voltage. In the section B, all LED channels in the first LED operation unit 100 operate and only the second LED operation unit 200 performs the switching operation, as described in FIG. 4, and then a corresponding LED channel operates according to the input voltage.

When the first LED operation unit 300 and the second LED operation unit 400 are connected in parallel as shown in FIG. 6, the first LED operation unit 300 and the second LED operation unit 400 performs the same operation described in FIG. 4 in at the same amount of the input voltage according to the input voltage.

The lighting device of the present invention described above has advantages as follows.

The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed. In addition, when the plurality of the LED operation units are connected in series, n times brightness can be used in the section in which the $n^{th}$ LED operation unit operates, compared with using one LED operation unit. In addition, when m LED operation units are connected in parallel, m times brightness can be used regardless of the amount of the input voltage, compared with using one LED operation unit.

Figure 8:
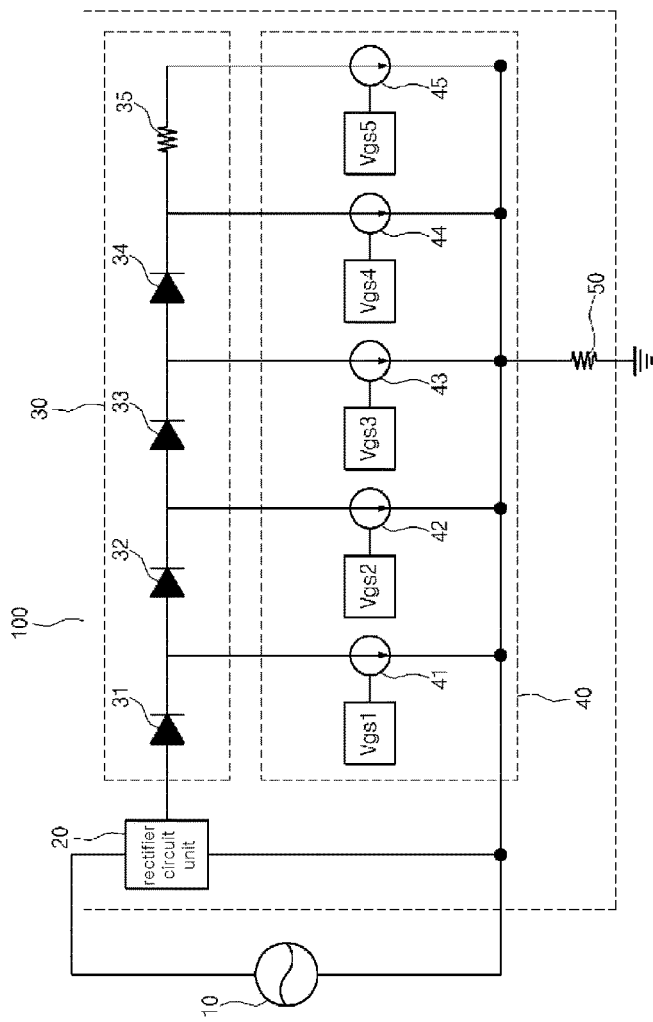
FIG. 8 is a diagram showing a basic structure of a LED lighting device, according to some embodiment of the present invention.

FIG. 8 is a diagram showing a basic structure of a LED lighting device, according to some embodiment of the present invention.

The lighting device of this embodiment includes the LED operation unit 100 receiving from the power source unit 10. Herein, a plurality of LED operation units 100 are included, each of which is connected in parallel to the power source unit 10. However, in FIG. 8, one LED operation unit 100 is connected to the power source unit 10 will be described in order to describe the operation of the LED operation unit 100.

The power source unit 10 supplies the input power. Since the power source unit 10 uses an AC power source, the amount of the input voltage is periodically changed as time passes.

The LED operation unit 100 includes the rectifier circuit unit 20, the LED unit 30, the switch unit 40, the current sensing resistor 50.

The rectifier circuit unit 20 receives the AC input power from the power source unit 10, rectifies the input power, and outputs a rectified power.

The LED unit 30 receives the power from the rectifier circuit unit 20 to perform the operation. The plurality of the LED channels are connected in series, and the resistor unit 35 is connected to a lower portion of the last LED channel.

Hereinafter, the present invention will be described with an assumption of n=4 for easy description.

The switch unit 40 includes a plurality of the switches 41, 42, 43, 44, 45. The $n^{th}$ switch is connected to the rear end of the $n^{th}$ LED channel so as to control an operation of the LED channel. The $n^{th}$ switch is controlled by a sum of a current of the $n^{th}$ switch and a current of the $(n+1)^{th}$ switch, which flows through the current sensing resistor.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

In FIG. 8, for example, the second LED channel 32 and the first switch 41 are connected an end next to the first LED channel 31. The third LED channel 33 and the second switch 42 are connected an end next to the second LED channel 32. The fourth LED channel 34 and the third switch 43 are connected an end next to the third LED channel 33. The resistor unit 35 and the fourth switch 44 are connected an end next to the fourth LED channel. The fifth switch 45 is connected an end next to the resistor unit 35.

Herein, each of the switches consists of a FET (Field Effect Transistor), for example, a NMOS FET.

The current sensing resistor 50 is connected to each of the switches 41, 42, 43, 44, 45 included in the switch unit 40. Thus, when a current flow through the switches, the current flowing through the current sensing resistor 50 is a sum of the currents flowing through the switches.

The current sensing resistor 50 may consist of a variable resistor.

According to the present invention, the LED channels operate according to the amount of the input power source. A corresponding LED channel operates according to the amount of the rectified power source inputted the LED unit 30.

The operations of the switch unit 40, the current sensing resistor 50, and the resistor unit 35 according to this embodiment can be described with reference of the above description of FIG. 4.

Thus, according to the present invention, when the resistor unit 35 is connected to the last end of the LED unit 30, the voltage is distributed at the resistor unit 35, and a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

In addition, this embodiment has the same distinguishable features of power consumption as those in the embodiment of FIG. 4. Accordingly, as the forward voltage Vf of the LED channel is redistributed, the heat generation at the switch unit 40 becomes same even when the input voltage is changed.

Figure 9:
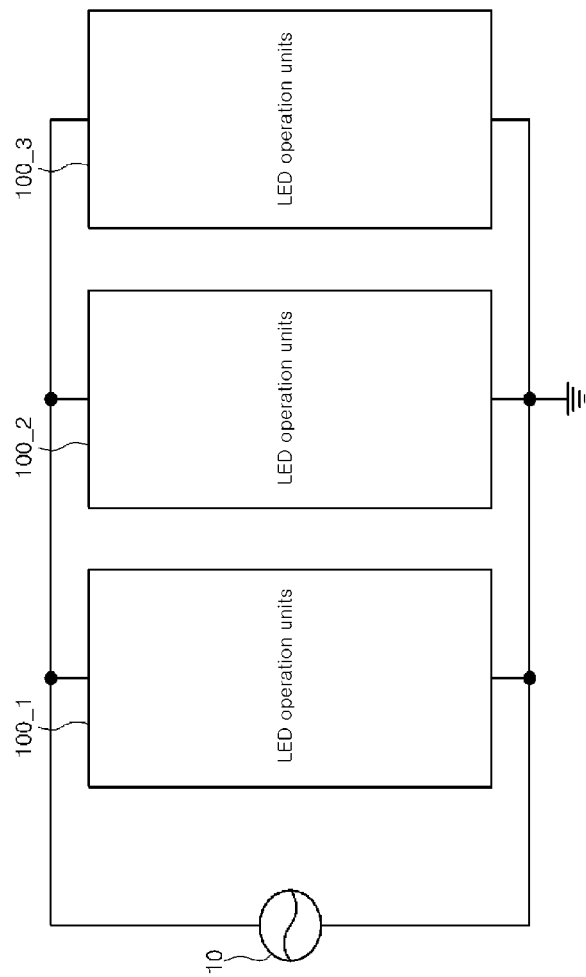
FIG. 9 is a diagram showing a structure in which a plurality of LED operation units are connected to a power source unit, according to some embodiment of the present invention.

FIG. 9 is a diagram showing a structure in which a plurality of LED operation units are connected to a power source unit, according to some embodiment of the present invention.

According to the present invention, each of the LED operation units is connected to the power source unit 10 in parallel, as shown in FIG. 9.

In FIG. 9, the LED lighting device includes three LED operation units 100_1, 100_2, 100_3 connected each other in parallel.

Each of the LED operation units 100_1, 100_2, 100_3 includes the rectifier circuit unit 20, the LED unit 30, the switch unit 40, and the current sensing resistor 50, as described in FIG. 8. The switching operation of the switch unit 40 and the operation of the LED unit 30 in each of the LED operation units 100_1, 100_2, 100_3 are same as those described in FIG. 8.

When the LED operation units 100_1, 100_2, 100_3 are connected in parallel and LEDs having the same forward voltage Vf are used in the first LED operation unit 100_1, the second LED operation unit 100_2, and the third LED operation unit 100_3, as described in FIG. 9, each of the first LED operation unit 100_1, the second LED operation unit 100_2 and the third LED operation unit 100_3 independently perform the same operation at the same amount of the input voltage according to the amount of the input voltage V.

When the LED units in the first LED operation unit 100_1 and the second LED operation unit 100_2, and the third LED operation unit 100_3 has LEDs having different forward voltages Vf, the range of the input voltage operating each of the LED operation units 100_1, 100_2, 100_3 is changed according to the amount of the forward voltage Vf of each of the LED operation units 100_1, 100_2, 100_3.

As shown in FIG. 9, when the LED operation units 100_1, 100_2, 100_3 are connected in parallel, brightness becomes three times, compared with using one LED operation unit LED operation unit 100 under the same power.

According to the present invention, each of the LED operation units 100_1, 100_2, 100_3 is formed as a block structure, each block is connected to a plurality of blocks for user's convenience, and then the lighting device performing automatic switching can be used in a wider range. For example, when the lighting device is used for a stadium such as a baseball stadium or a soccer stadium, the lighting device of the present invention has distinguishable features providing easy and convenient use of the lighting device for the stadium with a plurality of the LED operation units covering all range of the stadium.

The rectifier circuit units included in the plurality of the LED operation units 100_1, 100_2, 100_3 may be the same rectifier circuit units or different rectifier circuit units having different output voltage ranges.

When the plurality of the LED operation units 100_1, 100_2, 100_3 include the same rectifier circuit units, each of the LED operation units 100_1, 100_2, 100_3 has the same lighting characteristics according to the input voltage outputted from the power source unit 10. However, when the plurality of the LED operation units 100_1, 100_2, 100_3 have different rectifier circuit units, the LED operation units 100_1, 100_2, 100_3 has different lighting characteristics according to the input voltage outputted from the power source unit 10. Thus, when different lighting characteristics are required in an area (range), a plurality of the LED operation units 100_1, 100_2, 100_3 are formed to include different rectifier circuit units, thereby providing required lighting characteristics for the corresponding area.

The lighting device of the present invention described above has advantages as follows. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed. In addition, since the LED operation unit is formed as the blocks, the lighting device of the present invention has distinguishable features to easily expand lighting by using a structure in which blocks are connected. In addition, when m LED operation units are connected in parallel, m times brightness can be used regardless of the amount of the input voltage, compared with using one LED operation unit. In addition, when the lighting is expanded by giving different rectifier circuit characteristics to the rectifier circuit unit of each of the LED operation units, the lighting device of the present invention has distinguishable features to use lighting satisfied to the expanded area.

Figure 10:
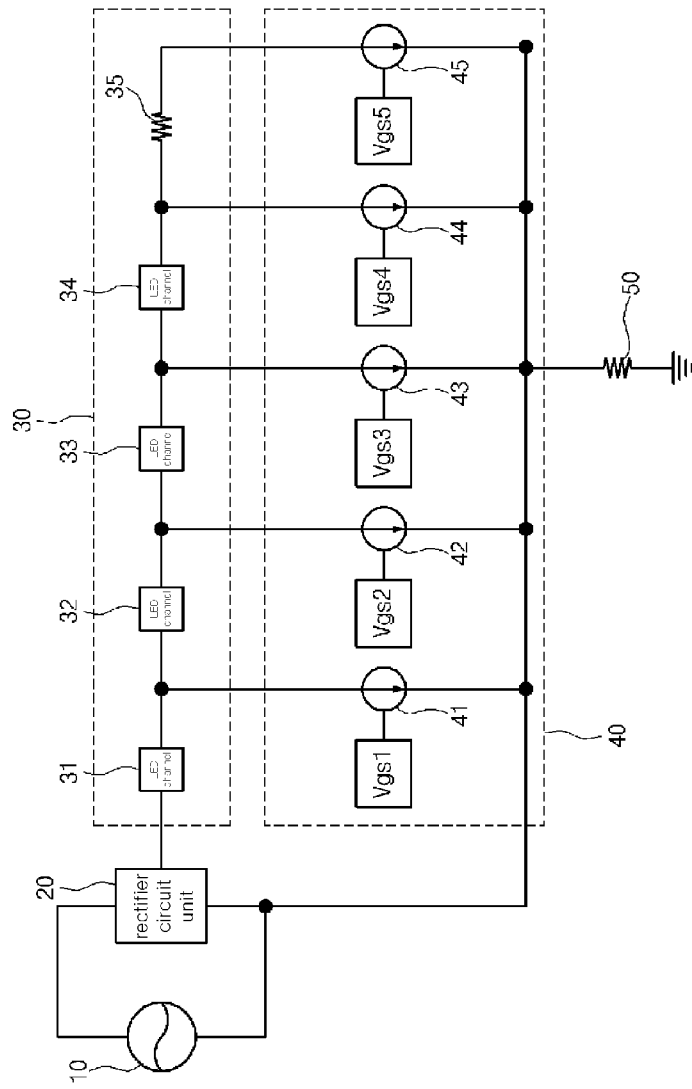
FIG. 10 is a diagram showing a structure of an LED lighting device having one LED operation unit, according to some embodiment of the present invention.

FIG. 10 is a diagram showing a structure of an LED lighting device having one LED operation unit, according to some embodiment of the present invention.

The power source unit 10 supplies the input power. Since the power source unit 10 uses an AC power source, the amount of the input voltage is periodically changed as time passes. The rectifier circuit unit 20 receives the AC input power from the power source unit 10, rectifies the input power, and outputs a rectified power.

The LED unit 30 receives the power from the rectifier circuit unit 20 to perform the operation. The plurality of the LED channels are connected in series, and the resistor unit 35 is connected to a lower portion of the last LED channel.

Hereinafter, the present invention will be described with an assumption of n=4 for easy description.

The switch unit 40 includes a plurality of the switches 41, 42, 43, 44, 45. The $n^{th}$ switch is connected to the rear end of the $n^{th}$ LED channel to control an operation of the LED channel. The $n^{th}$ switch is controlled by a sum of a current of the $n^{th}$ switch and a current of the $(n+1)^{th}$ switch, which flows through the current sensing resistor.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

In FIG. 10, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The resistor unit 35 and the fifth switch 44 are connected to an end next to the fourth LED channel 34. The fifth switch 45 is connected to an end next to the resistor unit 35.

Herein, each of the switches consists of a FET (Field Effect Transistor), for example, a NMOS FET.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

The current sensing resistor 50 may consist of a variable resistor.

According to the present invention, the LED channels operate according to the amount of the input power source. A corresponding LED channel operates according to the amount of the rectified power source inputted the LED unit 30.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

In addition, this embodiment has the same distinguishable features of power consumption as those in the embodiment of FIG. 4. Accordingly, as the forward voltage Vf of the LED channel is redistributed, the heat generation at the switch unit 40 becomes same even when the input voltage is changed.

Figure 11:
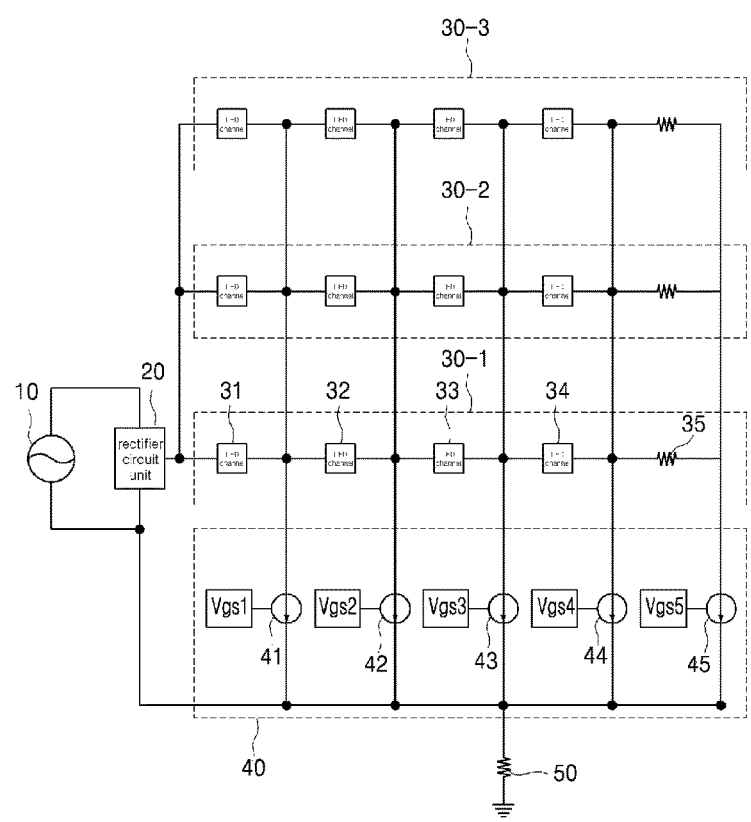
FIG. 11 is a diagram showing a circuit structure having one or more LED operation units, according to some embodiment of the present invention.

FIG. 11 is a diagram showing a circuit structure having one or more LED operation units, according to some embodiment of the present invention.

According to the present invention, the LED unit 30 consists of blocks. Thus, the LED unit 30 formed as blocks is more than one and is connected in parallel, as shown in FIG. 11, thereby forming a lighting device having a LED unit formed in a parallel structure.

For this purpose, the LED lighting device having the LED unit formed as blocks of the present invention include a block connection unit having a matrix connection structure.

The LED unit 30 formed as blocks has a block structure having a certain connection structure and may be connected to the block connection unit in a insertion manner. That is, the LED unit 30 formed as blocks of the block connection unit is inserted and the matrix structure of the block connection unit is connected to have a predetermined circuit structure, thereby providing a predetermined circuit structure. For example, as shown in FIG. 11, the block connection unit is connected to have a plurality of parallel connection structures, the LED unit 30 is inserted to a corresponding position, and then the LED units 30_1, 30_2, 30_3 formed as blocks have parallel connection structures.

As shown in FIG. 11, when the LED units 30_1, 30_2, 30_3 are connected in parallel and the same input voltage is inputted, a lighting device having three times brightness can be formed, compared with a lighting device having one LED unit 30.

In FIG. 11, the LED unit is formed as blocks and connected to the block connection unit, as an exemplary description. However, the LED channel may be formed as blocks and connected to the block connection unit to form a predetermined circuit.

Figure 12:
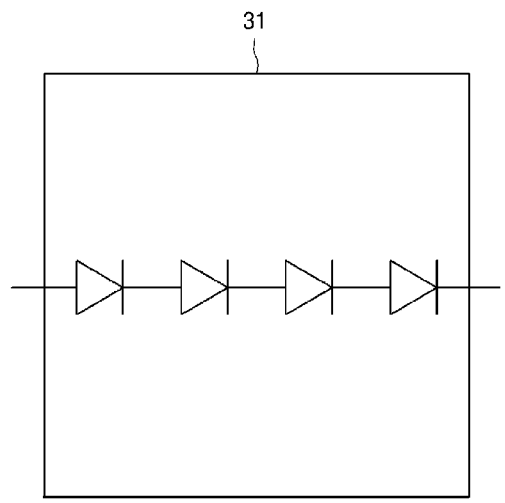
FIG. 12 and FIG. 13 are diagrams showing structures of LED channels having one or more LEDs, according to some embodiment of the present invention.
Figure 13:
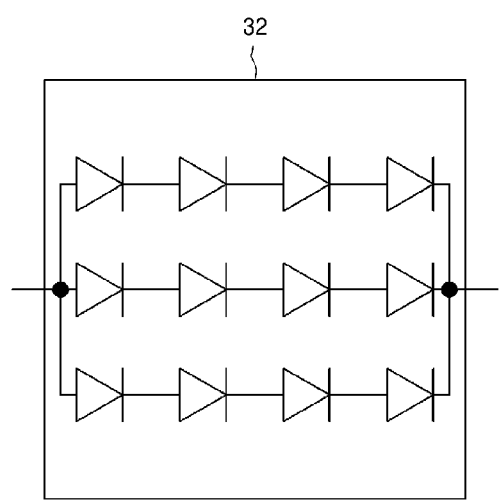

FIG. 12 and FIG. 13 are diagrams showing structures of LED channels having one or more LEDs, according to some embodiment of the present invention.

In FIG. 11, the circuit structure, in which the LED unit 30 is formed as blocks and one or more LED units 30 are connected in parallel, thereby increasing the brightness of the lighting device, is described. However, each of LED channels 31, 32, 33, 34 are formed as blocks and one or more LED channels 31, 32, 33, 34 are connected to a block connection unit having a matrix connection structure, thereby forming a lighting device having predetermined lighting brightness and a lighting colour.

For example, the LED channel 31 having four LEDs connected in series is formed as one block, as shown in FIG. 12.

Otherwise, for example, as shown in FIG. 13, the LED unit 32 may have a structure in which four LEDs connected in series is formed as one group and the groups each having four LEDs are connected in parallel.

As the blocks having LEDs are formed, a LED block may be formed according to a corresponding input voltage when the input voltage is 110V or 220V. That is, a LED circuit having maximum efficiency may be easily formed according to the input voltage.

Herein, each block can be formed to have a different lighting colour.

The lighting device of the present invention described above has advantages as follows. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed. In addition, when the plurality of the LED operation units are connected in series, n times brightness can be used in the section in which the $n^{th}$ LED operation unit operates, compared with using one LED operation unit. In addition, the LED channel or the LED unit formed as blocks is connected to the block connection unit, thereby easily forming a circuit of a lighting device having predetermined lighting brightness and a lighting colour.

Figure 14:
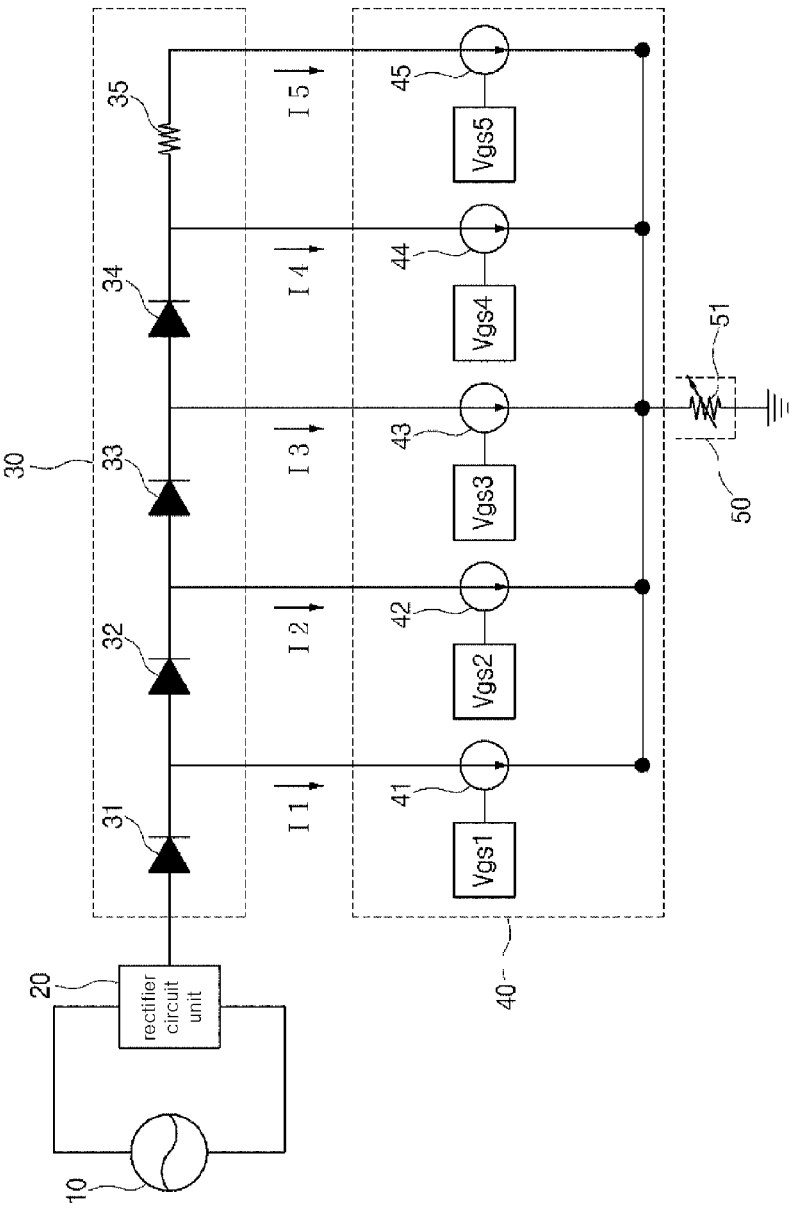
FIG. 14 is a diagram showing a structure of a lighting device in which the heat generation at a switch unit decreases, when a voltage equal to or greater than the rated voltage is inputted, according to some embodiment of the present invention.

FIG. 14 is a diagram showing a structure of a lighting device in which the heat generation at a switch unit decreases, when a voltage equal to or greater than the rated voltage is inputted, according to some embodiment of the present invention.

The lighting device, in which heating of a switch unit decreases when a voltage equal to or greater than the rated voltage is inputted, includes the power source unit 10, the rectifier circuit unit 20, the LED unit 30, the switch unit 40 and the dimming control unit 50.

The power source unit 10 supplies the input power. The rectifier circuit unit 20 receives the AC input power from the power source unit 10, rectifies the input power, and outputs a rectified power.

The LED unit 30 includes n LED channels connected in series, and the resistor unit 35 is connected to the last end of the last LED channel 34.

In FIG. 14, for example, the LED unit 30 includes 4 LED channels 31, 32, 33, 34. The resistor unit 35 is connected to an end next to the last LED channel 34 among the LED channels connected each other in series.

The switch unit 40 includes n+1 switches to operate the LED channels according to the input power source. Herein, the n switches among the n+1 switches controls the operations of the LED channels according to the input power source, and the $(n+1)^{th}$ switch operates the resistor unit 35.

In FIG. 14, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The resistor unit 35 and the fourth switch 44 are connected to an end next to the fourth LED channel 34. The fifth switch 45 is connected to an end next to the resistor unit 35.

Herein, each of the switches consists of a FET (Field Effect Transistor), for example, a NMOS FET.

The dimming control unit 50 may consist of a variable resistor.

The variable resistor 51 is connected to each of the switches 41, 42, 43, 44, 45 included in the switch unit 40. Thus, when currents flow through the switches, the current flowing through the current variable resistor 51 is a sum of the currents flowing through the switches.

The dimming control unit 50 further includes a switch (not shown) controlling the resistance value of the variable resistor 51.

According to the present invention, the LED channels operate according to the amount of the input power source. A corresponding LED channel operates according to the amount of the rectified power source inputted the LED unit 30.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

Figure 15:
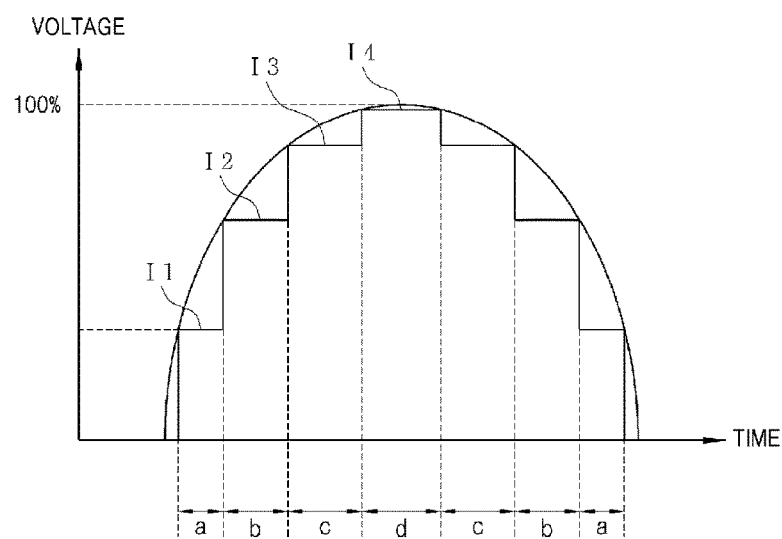
FIG. 15 is a diagram showing currents applied to the positions of LED channels according to input voltages, according to some embodiment of the present invention.

FIG. 15 is a diagram showing currents applied to the positions of LED channels according to input voltages, according to some embodiment of the present invention.

As described in FIG. 15, when a voltage equal to greater than the forward voltage Vf is inputted according to the input voltage, a saturation current flows through each of the LED channels 31, 32, 33, 34.

Section a in FIG. 15 is a section in which the input voltage operating the first LED channel 31 is inputted. Thus, in the section a, a current I1 flows through the first LED channel 31 and the first switch 41.

Section b is a section in which the input voltage operating the second LED channel 32 is inputted. Thus, in the section b, a current I2 flows through the second LED channel 32 and the second switch 42.

Section c is a section in which the input voltage operating the third LED channel 33 is inputted. Thus, in the section c, a current I3 flows through the third LED channel 33 and the third switch 43.

Section d is a section in which the input voltage operating the fourth LED channel 34 is inputted. Thus, in the section d, a current I4 flows through the fourth LED channel 34 and the fourth switch 44.

In FIG. 15, the section a is a section in which the first switch operates and then the first LED channel operates. The section b is a section in which the second switch operates and then the first LED channel and the second LED channel operate. The section c is a section in which the third switch operates and then the first LED channel, the second LED channel, and the third LED channel operate. The section d is a section in which the fourth switch operates and then the first LED channel, the second LED channel, the third LED channel, and the fourth LED channel operate.

In the present invention, the methods of dimming control are two methods as follows.

First, the dimming control is performed by controlling the resistance value of the variable resistor 51 included in the dimming control unit 50, controlling the operation of the $n^{th}$ and $(n+1)^{th}$ switches, and then controlling the operation of the $n^{th}$ and $(n+1)^{th}$ LED channels.

That is, the resistance value of the variable resistor 51 is controlled to control the number of the operations of the LED channel. Thus, the resistance value of the variable resistor 51 is controlled regardless of the input voltage to the sequence of the switches to be operated, and then the number of LED channel to be operated can be controlled.

Thus, when a bright lighting is required, the variable resistor value is decreased to make the number of the switches to be operated greater and to increase the number of the LED channels to be operated, and then the lighting becomes bright. When a weak lighting is required, the variable resistor value is increased to make the number of the switches to be operated lower and to decrease the number of the LED channels to be operated, and then the lighting becomes weak.

That is, the number of LEDs to be operated is controlled to perform the dimming control regardless of the section of input voltage.

Second, the dimming control is performed by controlling the resistance value of the variable resistor 51 included in the dimming control unit 50, controlling the current value flowing through the $n^{th}$ switch, and then changing the current value flowing through the LED channel to be operated through the $n^{th}$ switch.

The dimming control by the second method will be described in FIG. 16.

Figure 16:
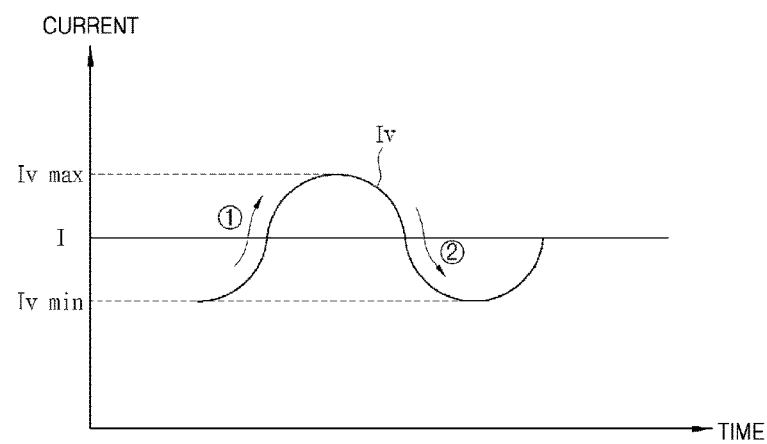
FIG. 16 is a diagram showing a dimming control by changing a current value flowing through an LED channel, according to some embodiment of the present invention.

FIG. 16 is a diagram showing a dimming control by changing a current value flowing through an LED channel, according to some embodiment of the present invention.

According to the present invention, the dimming control is performed by controlling the resistance value of the variable resistor 51 included in the dimming control unit 50, controlling the current value flowing through the $n^{th}$ switch, and then changing the current values flowing through all LED channels to be operated by the $n^{th}$ switch.

According to the present invention, when the current flowing through the LED channel to be operated through the $n^{th}$ switch is I, the resistance value of the variable resistor 51 is changed to change the current value of the current I flowing through the LED channel in the range from Ivmax to Ivmin.

That is, when a bright lighting is required, the variable resistor value is reduced to make the operation current value of the LED channel Ivmax, thereby controlling the dimming of the LED channel bright. When a weak lighting is required, the variable resistor value is raised to make the operation current value of the LED channel Ivmin, thereby controlling the dimming of the LED channel dark.

In addition, the present invention has distinguishable features according to the power consumption.

From the first switch to the fourth switch, when the input voltage increases, the $n^{th}$ switch is operated by the remained voltage formed by subtracting the forward voltage at the $n^{th}$ LED channel. When the more voltage is inputted, the $n^{th}$ switch becomes the off-state and the $(n+1)^{th}$ switch operates so as to increase the power consumption (heat generation). However, the total power consumption is within a specific system standard range. When a voltage equal to or greater than the rated voltage is inputted, an excessive current flows through the fifth switch 45 (the last switch), and then the power consumption (heat generation) becomes greater than the system standard range. Thus, when the voltage equal to or greater than the rated voltage is inputted, overheating occurs at the fifth switch 45.

According to the present invention, since the resistor unit 35 is included, heat can be generated at the resistor unit 35 when the voltage equal to or greater than the rated voltage is inputted, thereby reducing the heat generating at the fifth switch 45.

In addition, according to the present invention, the forward voltages Vf of the LED channels are unevenly redistributed, and then the power consumed at each switch becomes almost same. That is, the forward voltage Vf of the $(n+1)^{th}$ LED channel increases greater than the forward voltage Vf of the $n^{th}$ LED channel, and then the power consumption at the $n^{th}$ switch and the power consumption at the $(n+1)^{th}$ switch become almost same. By the redistribution of the forward voltages Vf of the LED channels, the heat generation at the switch unit 40 becomes same regardless of the change of the input voltage.

Herein, although the forward voltage Vf of each LED channel can be freely changed, the total amount of the forward voltages Vf is set as the maximum value of the input voltage The lighting device of the present invention described above has advantages as follows. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

Figure 17:
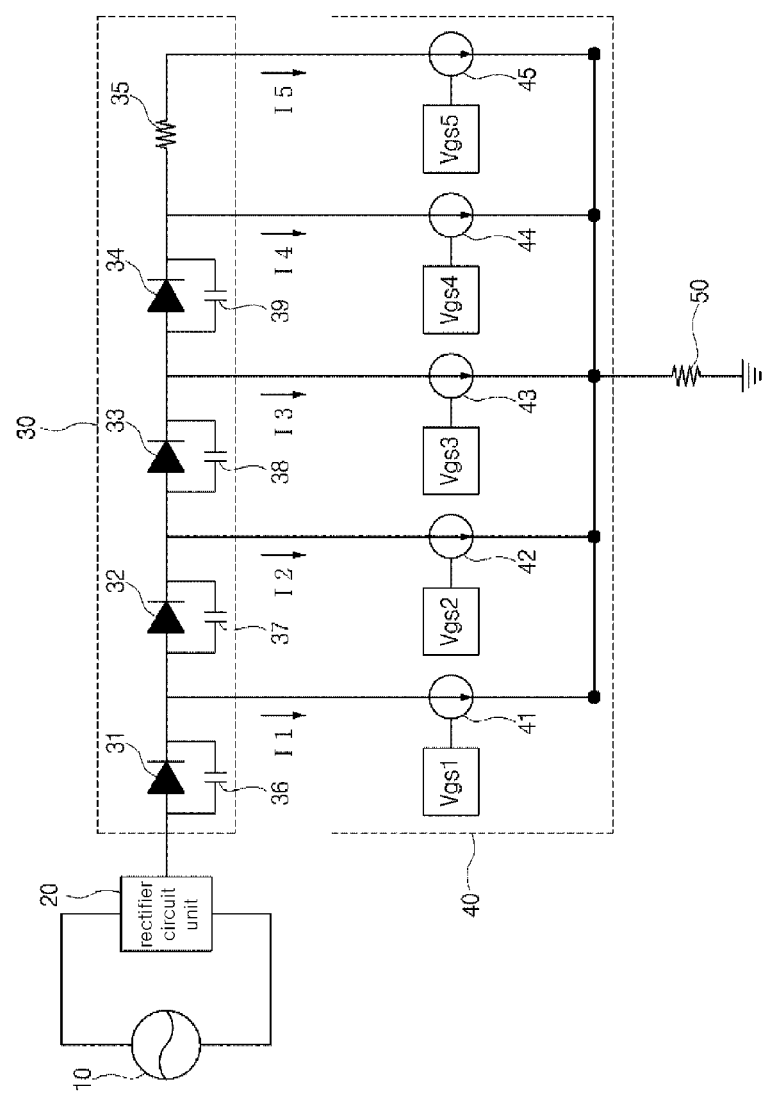
FIG. 17 is a diagram showing a structure of an LED lighting device in which a capacitor is connected in parallel to a LED channel to prevent a flicker phenomenon, according to some embodiment of the present invention.

FIG. 17 is a diagram showing a structure of an LED lighting device in which a capacitor is connected in parallel to a LED channel to prevent a flicker phenomenon, according to some embodiment of the present invention.

The LED lighting device preventing the flicker phenomenon having the power source unit 10, the rectifier circuit unit 20, the LED unit 30, the switch unit 40, and the current sensing resistor 50.

The power source unit 10 supplies the input power. The rectifier circuit unit 20 receives the AC input power from the power source unit 10, rectifies the input power, and outputs a rectified power.

The LED unit 30 includes n LED channels connected in series. A resistor unit 36 is connected to the last end of the last LED channel 35. In addition, each of the LED channels has a structure in which a capacitor is connected in parallel.

The switch unit 40 includes n+1 switches. The mth switch is connected to the rear end of the mth LED channel and the last switch is connected to the rear end of the resistor unit. Herein, "n" and "m" indicate natural numbers.

Hereinafter, the present invention will be described with an assumption of n=4 for easy description.

In FIG. 17, for example, the second LED channel 32 and the first switch 41 are connected an end next to the first LED channel 31. The third LED channel 33 and the second switch 42 are connected an end next to the second LED channel 32. The fourth LED channel 34 and the third switch 43 are connected an end next to the third LED channel 33. The resistor unit 35 and the fourth switch 44 are connected an end next to the fourth LED channel. The fifth switch 45 is connected an end next to the resistor unit 35.

Herein, each switch in the switch unit 40 consists of a FET (Field Effect Transistor), for example, a NMOS FET.

The current sensing resistor 50 may consist of a variable resistor.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

Before each of capacitors 36, 37, 38, 39 connected in parallel to the LED channels is fully charged, the switch unit 40 of the present invention operates in following manners.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

The switching method of the switch unit 40 is described above for the case when each of capacitors 36, 37, 38, 39 connected in parallel to the LED channels is not fully charged.

When the input voltage increases and each of the capacitors 36, 37, 38, 39 are fully charged, the power can be supplied to the LED channel connected in parallel by the voltage charged in the capacitor even when the input voltage decreases.

That is, when the input voltage is less than 200V, the fourth LED channel 34 does not operate in a conventional lighting device. While, according to the present invention, a voltage charged in the fourth capacitor 39 connected in parallel to the fourth LED channel 34 is supplied to the fourth LED channel 34, thereby operating the fourth LED channel 34.

In addition, when the input voltage is less than 150V, the third LED channel 33 does not operate in the conventional lighting device. While, according to the present invention, a voltage charged in the third capacitor 38 connected in parallel to the third LED channel 33 is supplied to the third LED channel 33, thereby operating the third LED channel 33.

In addition, when the input voltage is less than 100V, the second LED channel 32 does not operate in the conventional lighting device. While, according to the present invention, a voltage charged in the second capacitor 37 connected in parallel to the second LED channel 32 is supplied to the second LED channel 32, thereby operating the second LED channel 32.

In addition, when the input voltage is less than 50V, the first LED channel 31 does not operate in the conventional lighting device. While, according to the present invention, a voltage charged in the first capacitor 36 connected in parallel to the first LED channel 31 is supplied to the first LED channel 31, thereby operating the first LED channel 31.

According to the present invention, when the capacitor connected in parallel to the LED panel is fully charged, a voltage charged in a capacitor can be supplied to the corresponding LED channel, thereby operating the LED channel, even when the input voltage does not reach the voltage operating the corresponding LED channel.

Thus, all LED channels may be operated regardless of the input voltage, thereby preventing a flicker phenomenon.

Figure 18:
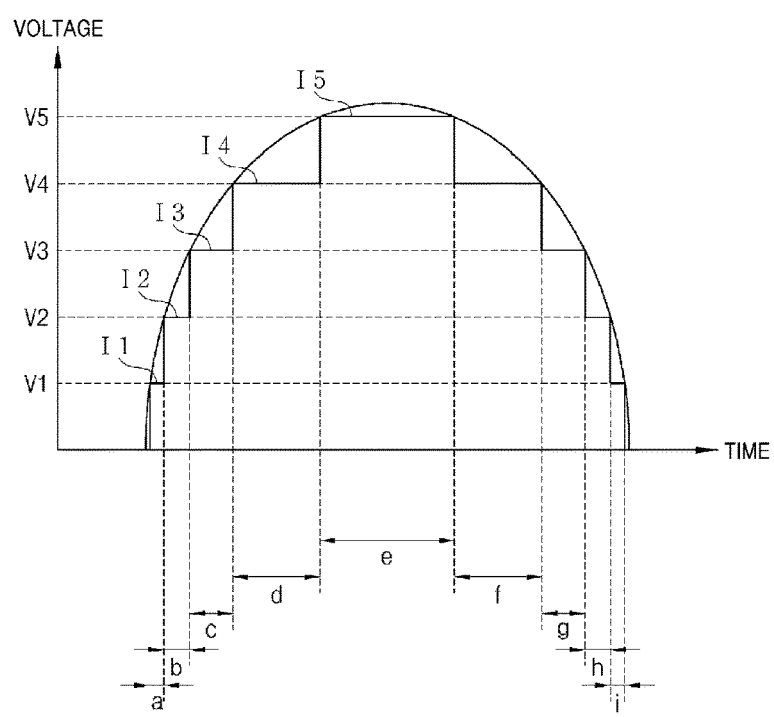
FIG. 18 is a diagram showing the operation of an LED channel according to an input voltage, according to some embodiment of the present invention.

FIG. 18 is a diagram showing the operation of an LED channel according to an input voltage, according to some embodiment of the present invention.

As described above, when a voltage equal to or greater than the forward voltage Vf is inputted according to the input voltage, a current flows through each of LED channels 31, 32, 33, 34.

In FIG. 18, "V1" indicates a voltage with which the first LED channel 31 can be operated. "V2" indicates a voltage with which the second LED channel 32 can be operated. "V3" indicates a voltage with which third LED channel 33 can be operated. "V4" indicates a voltage with which the fourth LED channel 34 can be operated. "V5" indicates a voltage equal to or greater than the rated voltage.

In FIG. 18, "I1" indicates a current flowing through the first LED channel 31. "I2" indicates a current flowing through the second LED channel 32. "I3" indicates a current flowing through the third LED channel 33. "I4" indicates a current flowing through the fourth LED channel 34. "I5" indicates a current flowing through the resistor unit 35 and the fifth switch 45.

Before the capacitor is not fully charged, the current according to the input current flows through each of capacitors. However, current does not flow through the capacitor fully charged, but flows though the LED channels connected in parallel.

In the section a and the section i, the input voltage is inputted between V1 and V2 and the first LED channel 31 operates. In this case, the current I1 flows through the first switch 41.

In the section b and the section h, the input voltage is inputted between V2 and V3 and the second LED channel 32 operates. In this case, the current I2 flows through the second switch 42.

In the section c and the section g, the input voltage is inputted between V3 and V4 and the third LED channel 33 operates. In this case, the current I3 flows through the third switch 43.

In the section d and the section f, the input voltage is inputted between V4 and V5 and the fourth LED channel 34 operates. In this case, the current I4 flows through the fourth switch 44.

In the section e, the input voltage equal to or greater than the rated voltage is inputted, and current I5 flows through the resistor unit 35 and the fifth switch 45.

In a conventional lighting device, only the first LED channel 31 operates in the section a and the section i. The first LED channel 31 and the second LED channel 32 operate in the section b and the section h. The first LED channel 31, the second LED channel 32, and the third LED channel 33 operate in the section c and the section g. The first LED channel 31, the second LED channel 32, the third LED channel 33, and the fourth LED channel 34 operate in the section d and the section f. Thus, the LED channels sequentially operates or not according to the amount of the input voltage, thereby generating a flicker phenomenon.

That is, conventionally, only when the input voltage reaches a cartain voltage operating a corresponding LED channel, the corresponding LED channel operates. However, according to the present invention, when voltage is sufficiently charged in the capacitors, the capacitor connected in parallel to the each of the LED channels supplies a voltage to the corresponding LED channel, and then all LED channels can operate regardless of the input voltage.

Figure 19:
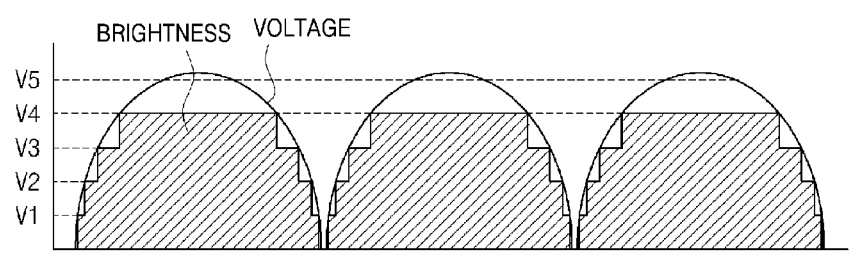
FIG. 19 is a diagram showing a brightness change according to an input voltage, according to some embodiment of the present invention.
Figure 19:
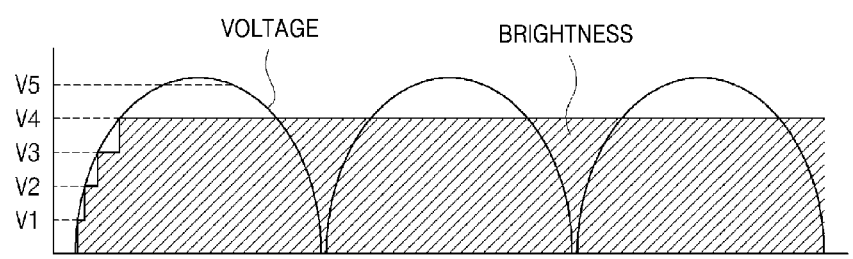

FIG. 19 is a diagram showing a brightness change according to an input voltage, according to some embodiment of the present invention.

FIG. 19(*a*) is a diagram showing brightness according to the input voltage of a conventional lighting device.

In the conventional lighting device, the LED channel to be operated according to the input voltage is changed, the LED channel to be operated according to the section of the input voltage is changed, and then brightness is changed. That is, brightness is changed in a step functional manner, as shown in FIG. 19(*a*).

FIG. 19(*b*) is a diagram showing brightness according to the input voltage of LED lighting device preventing a flicker phenomenon, according to the present invention.

The LED lighting device preventing the flicker phenomenon of the present invention receives voltage from the capacitor connected in parallel to the LED channel, all LED channels can be operated regardless of the amount of the input voltage except the section in which the capacitor is fully charged, thereby maintaining constant brightness, as shown in FIG. 19(*b*).

The lighting device of the present invention described above has advantages as follows. When a voltage equal to or greater than the rated voltage is inputted and an over-current flows, a current blocking control unit blocks current flowing through the switch unit formed of IC and protects the switch unit. In addition, the FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

Figure 20:
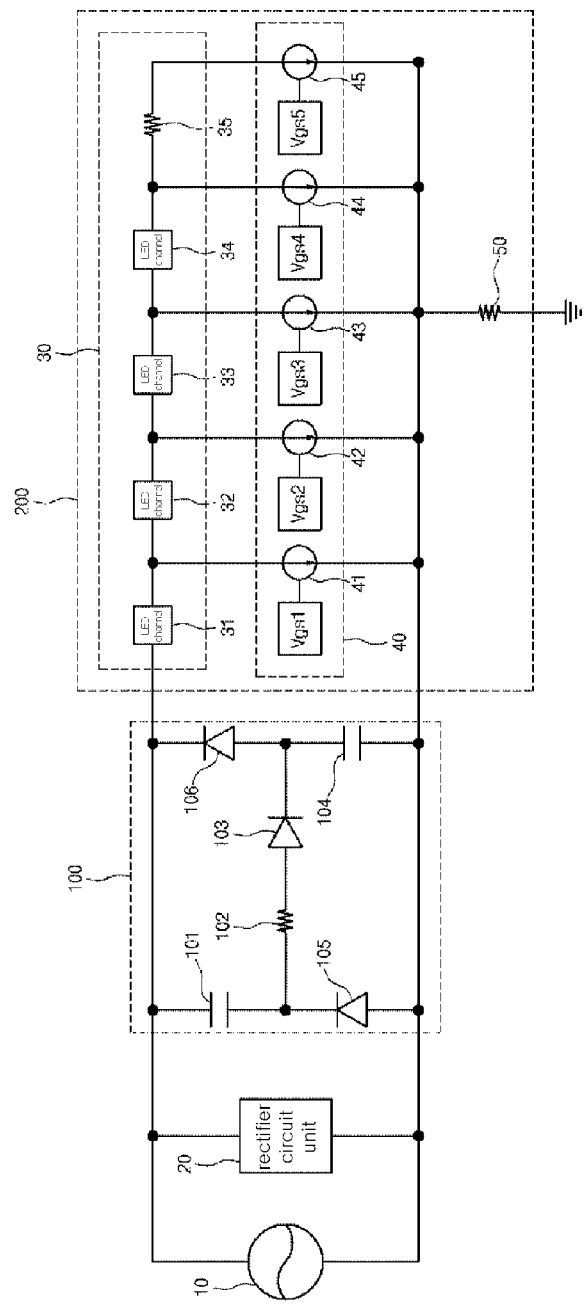
FIG. 20 is a diagram showing a structure of an LED lighting device having a circuit to reduce a flicker phenomenon, according to some embodiment of the present invention.

FIG. 20 is a diagram showing a structure of an LED lighting device having a circuit to reduce a flicker phenomenon, according to some embodiment of the present invention.

The LED lighting device having a circuit to reduce a flicker phenomenon of the present invention includes the power source unit 10, the rectifier circuit unit 20, the charge storage circuit unit 100, and the LED operation unit 200.

The power source unit 10 supplies the input power. Since the power source unit 10 uses an AC power source, the amount of the input voltage is periodically changed as time passes. The rectifier circuit unit 20 receives the AC input power from the power source unit 10, rectifies the input power, and outputs a rectified power.

When a voltage inputted from the rectifier circuit unit 20 is a high voltage, the charge storage circuit unit 100 stores charge. When the voltage is a low voltage, the charge storage circuit unit 100 outputs the stored charge to the LED operation unit 200.

The structure and function of the charge storage circuit unit 100 will be described in detains in FIG. 21.

The LED operation unit 200 includes the LED unit 30, the switch unit 40, and the current sensing resistor 50.

The LED unit 30 includes the plurality of the LED channels (n LED channels) connected in series. The resistor unit 35 is connected to a lower portion of the last LED channel 34.

The switch unit 40 includes n+1 switches to operate the LED channels according to the input power source. Herein, the n switches among the n−1 switches controls the operations of the LED channels according to the input power source, and the (n+1)$^{th}$ switch operates the resistor unit 35.

Hereinafter, the present invention will be described with an assumption of n=4 for easy description.

In FIG. 20, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The resistor unit 35 and the fourth switch 44 are connected to an end next to the fourth LED channel 34. The fifth switch 45 is connected to an end next to the resistor unit 35.

Herein, each of the switches consists of a FET (Field Effect Transistor), for example, a NMOS FET.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

The current sensing resistor 50 may consist of a variable resistor.

According to the present invention, the LED channels operate according to the amount of the input power source. A corresponding LED channel operates according to the amount of the rectified power source inputted the LED unit 30.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

In addition, this embodiment has the same distinguishable features of power consumption as those in the embodiment of FIG. 4. Accordingly, as the forward voltage Vf of the LED channel is redistributed, the heat generation at the switch unit 40 becomes same even when the input voltage is changed.

Figure 21:
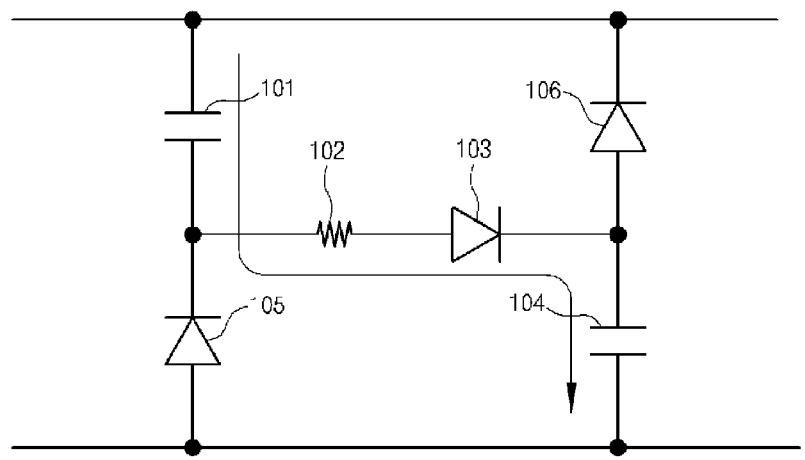
FIG. 21 is a diagram showing a structure and a function of a charge storage circuit unit, according to some embodiment of the present invention.

FIG. 21 is a diagram showing a structure and a function of a charge storage circuit unit, according to some embodiment of the present invention.

The charge storage circuit unit 100 includes a first condenser 101, a second condenser 104, a first diode 105, a second diode 103, and a third diode 106.

In the circuit structure of the charge storage circuit unit 100, the second diode 103 is connected in a forward direction between the first condenser 101 and the second condenser 104. An end of the first condenser 101 is connected to a power source voltage node of the rectifier circuit unit 20. An end of the second condenser 104 is connected to a ground. The first diode 105 is connected in a backward direction between the ground and a node to which the first condenser 101 and the second diode 103 are connected. The third diode 106 is connected between the LED unit 30 and a node to which the second condenser 104 and second diode 103 are connected. Herein, the resistor 102 may be further connected between the second diode 103 and a node to which the first condenser 101 and first diode 105 are connected.

The charge storage circuit unit 100 receives a voltage from the rectifier circuit unit 20 and stores charges. In addition, when the voltage outputted from the rectifier circuit unit 20 is lower than the voltage stored in the charge storage circuit unit 100, the stored charges are outputted to provide power to the LED operation unit 200.

Since the stored charges are outputted to provide power to the LED unit 30 of the LED operation unit 200 when the voltage outputted from the rectifier circuit unit 20 is lower, the charge storage circuit unit 100 supplies a voltage to an LED unit channel which does not operate when the voltage outputted from the rectifier circuit unit 20 is lower. Thus, when lower input voltage inputted from the power source unit 10, the LED channel not to be operated can be operated, thereby reducing a flicker phenomenon.

In FIG. 21, when a voltage outputted from the rectifier circuit unit 20 is high, the path in which charges are stored to the charge storage circuit unit 100 is shown as an arrow.

In the charge storage circuit unit 100, when a voltage outputted from the rectifier circuit unit 20 is high, a current flows through the first condenser 101, the second diode 103 and the second condenser 104, thereby storing charges in the first condenser 101 and the second condenser 104. In addition, when a voltage outputted from the rectifier circuit unit 20 is low (that is, the voltage lower than the voltage stored in the charge storage circuit unit 100), the charges stored in the first condenser 101 and the second condenser 104 are outputted, thereby supplying a voltage to the LED unit 30.

Figure 22:
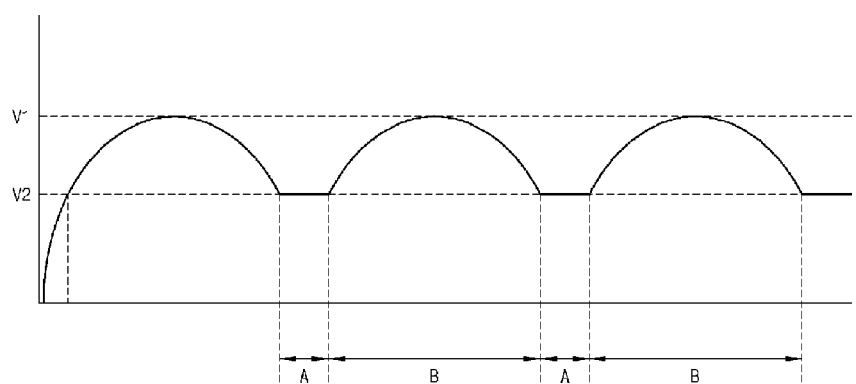
FIG. 22 is a diagram showing the amount of a voltage supplied to an LED operation unit, according to some embodiment of the present invention.

FIG. 22 is a diagram showing the amount of a voltage supplied to an LED operation unit, according to some embodiment of the present invention.

According to the present invention, the amount of the voltage inputted in the LED operation unit 200 is changed, as shown in FIG. 22.

Herein, "V1" indicates the maximum voltage of the input voltage. "V2" indicates a voltage stored in the charge storage circuit unit 100.

For a conventional LED lighting device without the charge storage circuit unit 100, LED channels sequentially operates or not according to the amount of the input voltage, thereby generating a significant flicker phenomenon.

However, according to the present invention, since the charge storage circuit unit 100 is included, a constant voltage V2 or more can be supplied to the LED unit 30, thereby reducing the flicker phenomenon, compared with the conventional LED lighting device.

For example, when the voltage V1 is a minimum voltage to operate the second LED channel 32, a voltage supplied to the LED unit 30 is always equal to or greater than voltage V1 in the LED lighting device having the circuit which reduces the flicker phenomenon of the present invention, and then the first LED channel 31 and the second LED channel 32 operates regardless of the amount of the input voltage.

That is, in the conventional LED lighting device, the first LED channel 31 and the second LED channel 32 operate or not according to the amount of the input voltage in the section A, thereby generating the flicker phenomenon caused by the first LED channel 31 and the second LED channel 32. However, in the present invention, all of the first LED channel 31 and the second LED channel 32 operate, and then any flicker phenomenon caused by the first LED channel 31 and the second LED channel 32 does not occur.

However, in the section B, a flicker phenomenon caused by the third LED channel 33 and the fourth LED channel 34, as the same as the conventional LED lighting device.

The lighting device of the present invention described above has advantages as follows. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed. In addition, the charge storage circuit unit is included to supply the stored charges to the LED unit, and then a voltage is supplied to the LED channel, which does not operate at the lower voltage, to operate, thereby reducing the flicker phenomenon.

Figure 23:
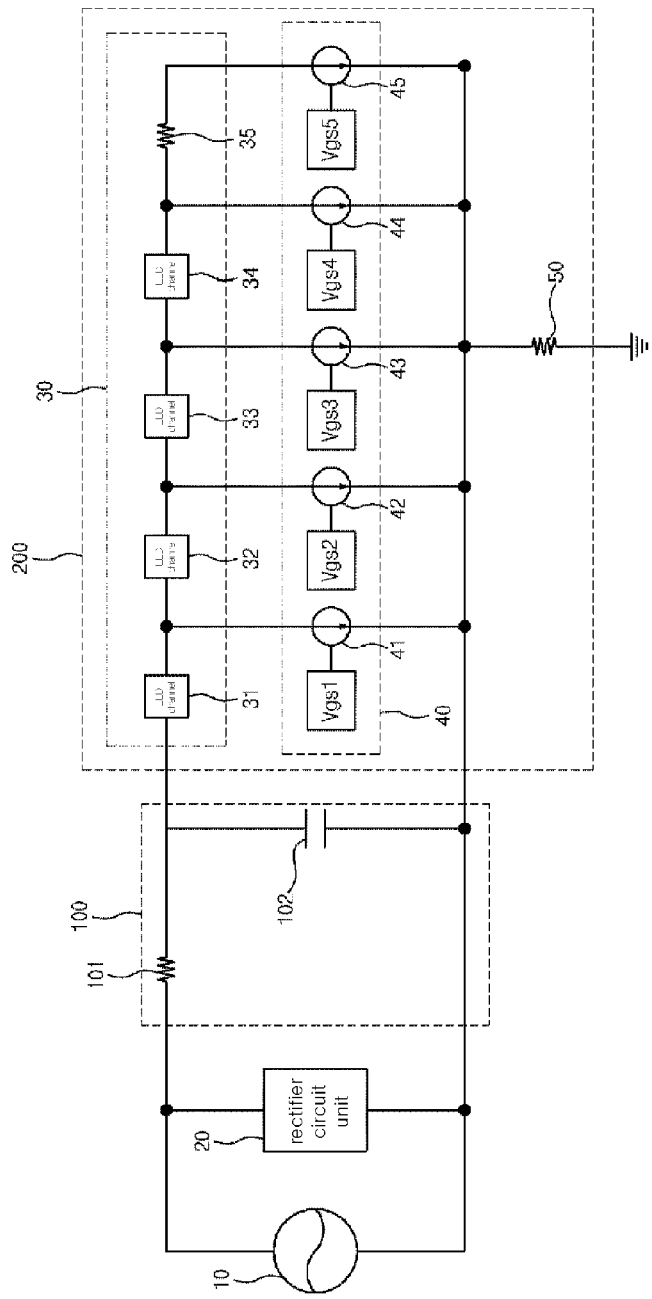
FIG. 23 is a diagram showing a structure of an LED lighting device having a circuit to eliminate ripple, according to some embodiment of the present invention.

FIG. 23 is a diagram showing a structure of an LED lighting device having a circuit to eliminate ripple, according to some embodiment of the present invention.

The LED lighting device having the circuit to eliminate ripple of the present invention includes the power source unit 10, the rectifier circuit unit 20, the ripple elimination circuit unit 100, and the LED operation unit 200.

The power source unit 10 supplies the input power. Since the power source unit 10 uses an AC power source, the amount of the input voltage is periodically changed as time passes. The rectifier circuit unit 20 receives the AC input power from the power source unit 10, rectifies the input power, and outputs a rectified power.

Figure 24:
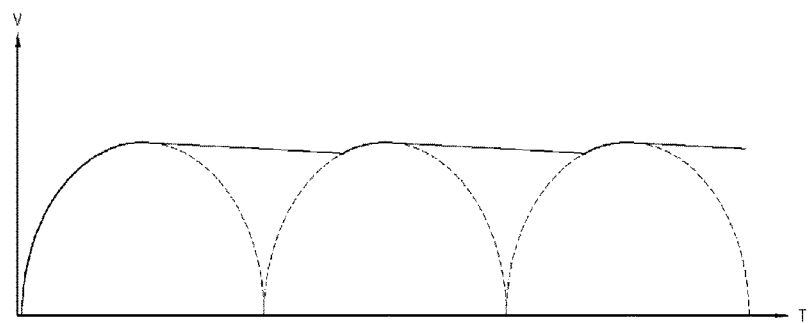
FIG. 24 is a diagram showing a voltage inputted to an LED operation unit by a ripple elimination circuit unit, according to some embodiment of the present invention.

The ripple elimination circuit unit 100 stores charges when a voltage inputted from the rectifier circuit unit 20 is high. The ripple elimination circuit unit 100 outputs the stored charges to the LED operation unit 200 when a voltage is low. Accordingly, the voltage inputted in the LED operation unit 200 is constant voltage after the ripple is removed, as shown in FIG. 24.

The LED operation unit 200 includes the LED unit 30, the switch unit 40, and the current sensing resistor 50.

The LED unit 30 includes the plurality of the LED channels (n LED channels) connected in series. The resistor unit 35 is connected to a lower portion of the last LED channel 34.

The switch unit 40 includes n+1 switches to operate the LED channels according to the input power source. Herein, the n switches among the n+1 switches controls the operations of the LED channels according to the input power source, and the $(n+1)^{th}$ switch operates the resistor unit 35.

Hereinafter, the present invention will be described with an assumption of n=4 for easy description.

In FIG. 23, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The resistor unit 35 and the fourth switch 44 are connected to an end next to the fourth LED channel 34. The fifth switch 45 is connected to an end next to the resistor unit 35.

Herein, each of the switches consists of a FET (Field Effect Transistor), for example, a NMOS FET.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

The current sensing resistor 50 may consist of a variable resistor.

According to the present invention, the LED channels operate according to the amount of the input power source. A corresponding LED channel operates according to the amount of the rectified power source inputted the LED unit 30.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

In addition, this embodiment has the same distinguishable features of power consumption as those in the embodiment of FIG. 4. Accordingly, as the forward voltage Vf of the LED channel is redistributed, the heat generation at the switch unit 40 becomes same even when the input voltage is changed.

The operations of the switches 41, 42, 43, 44, 45 of the switch unit 40, the operations of the LED channel 31, 32, 33, 34, and the operation of the resistor unit 35 are performed according to the amount of the input voltage inputted to the LED operation unit 200.

Thus, when a constant voltage is inputted to the LED operation unit 200 by the ripple elimination circuit unit 100, for example, when a voltage equal to or greater than the voltage to operate the third LED channel 33 is inputted, the first LED channel 31, the second LED channel 32, and the third LED channel 33 are always operate. The fourth LED channel 34 and the resistor unit 35 operates or not according to the amount of the voltage inputted to the LED operation unit 200.

FIG. 24 is a diagram showing a voltage inputted to an LED operation unit by a ripple elimination circuit unit, according to some embodiment of the present invention.

The ripple elimination circuit unit 100 includes the resistor 101 and the condenser 102.

In the circuit structure of the ripple elimination circuit unit 100, the resistor 101 is connected between the rectifier circuit unit 20 and the LED operation unit 200, and the condenser 102 is connected between a ground and a node to which the resistor 101 and the LED operation unit 200 are connected. Accordingly, when the input power from the power source unit 10 increases and is inputted, charges are stored in the condenser 102. When the input power from the power source unit 10 decreases and is inputted, charges stored in the condenser 102 are outputted to the LED operation unit 200, thereby eliminating the ripple.

In FIG. 24, the voltage inputted in the LED operation unit 200 becomes an about constant voltage to be inputted by the charge outputted from the ripple elimination circuit unit 100.

Without the ripple elimination circuit unit 100, the voltage inputted in the LED operation unit 200 is changed as time passes and show a ripple, as shown in a dotted line.

Herein, the amount of the ripple can be controlled by controlling the capacity of the condenser 102. For example, when the condenser 102 having a high capacity is used, the voltage inputted to the LED operation unit 200 becomes an about constant voltage.

Accordingly, the ripple elimination circuit unit 100 outputs the stored charges when the voltage outputted from the rectifier circuit unit 20 is a low voltage and supplies power to the LED unit 30 of the LED operation unit 200, thereby supplying a voltage to the LED unit channel which does not operate when a low voltage is outputted from the rectifier circuit unit 20. Thus, even when an input voltage inputted from the power source unit 10 is a low voltage, the LED channel which does not operated can be operated to reduce the flicker phenomenon.

Figure 25:
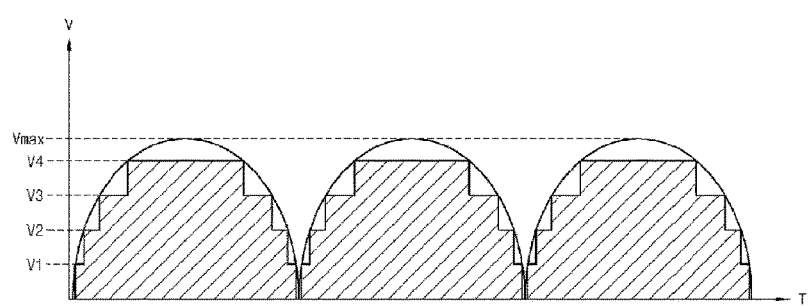
FIG. 25 is a diagram showing brightness without a ripple elimination circuit unit, according to some embodiment of the present invention.
Figure 26:
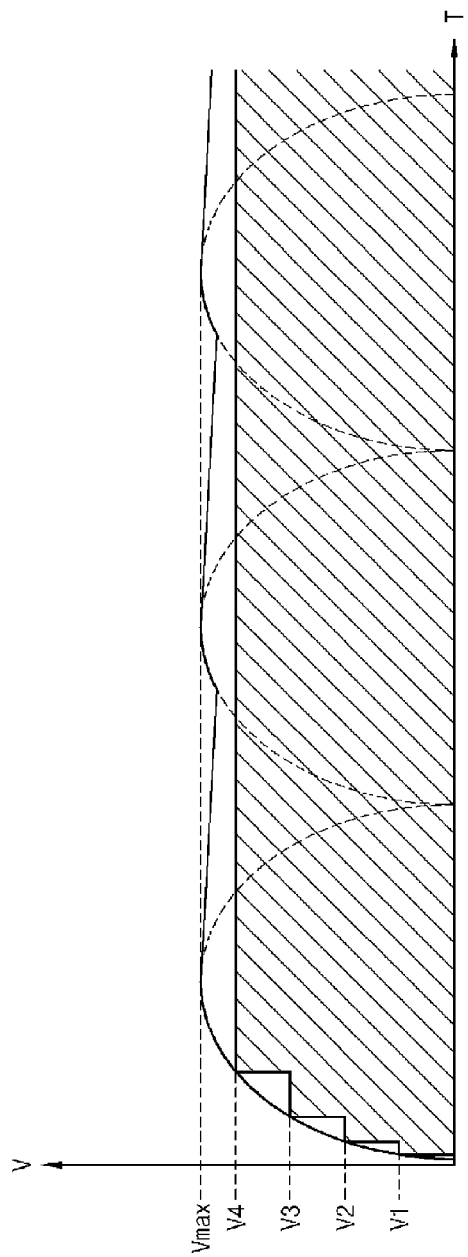
FIG. 26 is a diagram showing brightness with a ripple elimination circuit unit, according to some embodiment of the present invention.

FIG. 25 is a diagram showing brightness without a ripple elimination circuit unit, according to some embodiment of the present invention. FIG. 26 is a diagram showing brightness with a ripple elimination circuit unit, according to some embodiment of the present invention.

In the present invention, for the LED lighting device without the ripple elimination circuit unit 100, the input voltage is changed as time passes, and the number of the LED channels to operate according to the amount of the input voltage, thereby changing the brightness of the lighting device according to the input voltage.

"V1" indicates a voltage with which the first LED channel 31 can be operated. "V2" indicates a voltage with which the second LED channel 32 can be operated. "V3" indicates a voltage with which third LED channel 33 can be operated. "V4" indicates a voltage with which the fourth LED channel 34 can be operated. In the present invention, without the ripple elimination circuit unit 100, the number of the LED channels to be operated is changed according to the amount of the input voltage. That is, the brightness of the LED lighting device without the ripple elimination circuit unit 100 is changed, as shown in the hatching areas. When the input voltage is V4, the area of the brightness is greatest and thus the brightest lighting is provided. When the input voltage is changes in a manner of V4→V3-≥V2→V1 with ripples, the brightness decreases.

In the present invention, when the LED lighting device has the ripple elimination circuit unit 100, a constant input voltage without ripples is inputted to the LED operation unit 200, as shown in FIG. 26, and then the brightness corresponding to the hatching area can be provided.

In FIG. 26, the voltage inputted in the LED operation unit 200 is assumed to be equal to or greater than V4, all LED channels always operates to provide a constant brightness.

In the present invention, the effects of having the ripple elimination circuit unit 100 are as follows.

In a conventional LED lighting device without the ripple elimination circuit unit 100, the LED channels sequentially operates or not according to the amount of the input voltage, thereby generating a significant flicker phenomenon. However, in the present invention, since the ripple elimination circuit unit 100 is included, at least constant voltage is provided to the LED unit 30, thereby reducing the flicker phenomenon, compared with the conventional LED lighting device.

The lighting device of the present invention described above has advantages as follows. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed. In addition, since the ripple elimination circuit unit is included, the stored charge is supplied to the LED unit and at least constant voltage is always supplied to the LED channel, and then the LED channel to be operated at the corresponding voltage operates, thereby reducing the flicker phenomenon.

Figure 27:
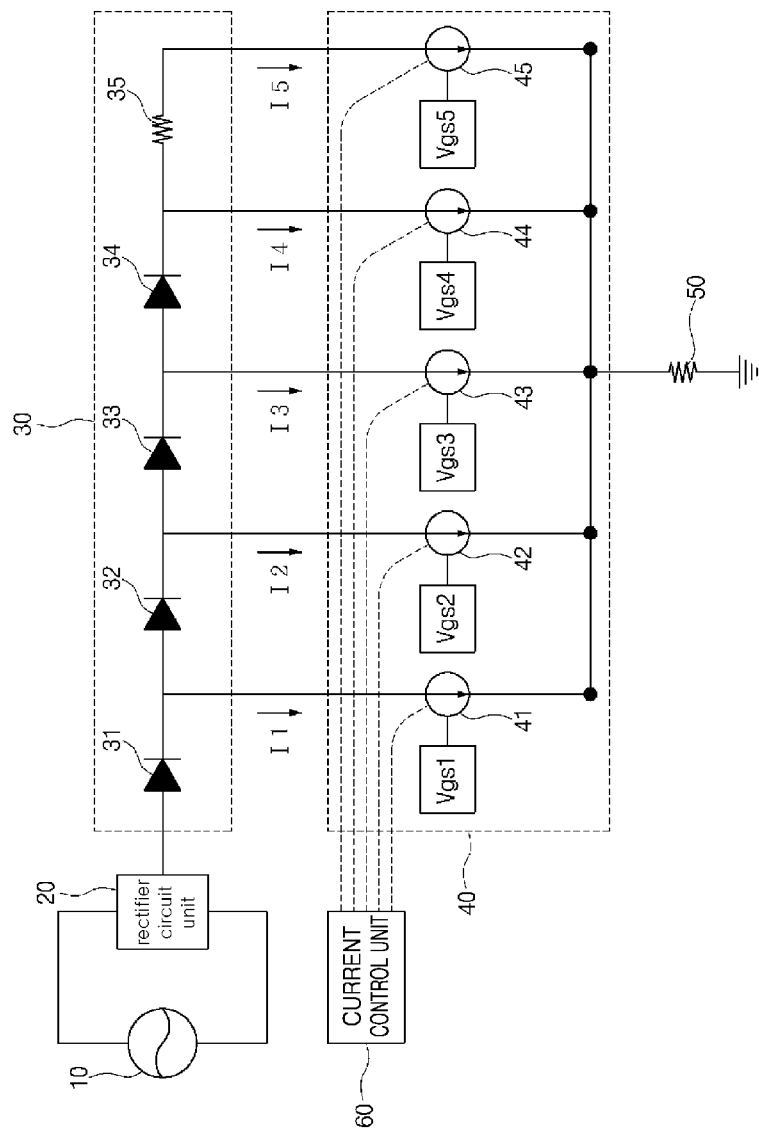
FIG. 27 is a diagram showing a structure of an LED lighting device protecting a switch unit by current control, according to some embodiment of the present invention.

FIG. 27 is a diagram showing a structure of an LED lighting device protecting a switch unit by current control, according to some embodiment of the present invention.

The LED lighting device protecting a switch unit by current control of the present invention includes the power source unit 10, the rectifier circuit unit 20, the LED unit 30, the switch unit 40, the current sensing resistor 50, and the current control unit 60.

The power source unit 10 supplies the input power. The rectifier circuit unit 20 receives the AC input power from the power source unit 10, rectifies the input power, and outputs a rectified power.

The LED unit 30 includes n LED channels connected in series. The resistor unit 35 is connected to a lower portion of the last LED channel 34.

Hereinafter, the present invention will be described with an assumption of n=4 for easy description.

In FIG. 27, the LED unit 30 includes 4 LED channels 31, 32, 33, 34. The resistor unit 35 is connected to an end next to the last LED channel 34 among the LED channels connected each other in series.

The switch unit 40 includes 5 switches to operate the LED channels according to the input power source. Herein, 4 switches, the first through fourth switches, among the 5 switches controls the operations of the LED channels according to the input power source, and the fifth switch operates the resistor unit 35.

In FIG. 27, for example, the second LED channel 32 and the first switch 41 are connected to an end next to the first LED channel 31. The third LED channel 33 and the second switch 42 are connected to an end next to the second LED channel 32. The fourth LED channel 34 and the third switch 43 are connected to an end next to the third LED channel 33. The resistor unit 35 and the fourth switch 44 are connected to an end next to the fourth LED channel 34. The fifth switch 45 is connected to an end next to the resistor unit 35.

Herein, each of the switches consists of a FET (Field Effect Transistor), for example, a NMOS FET.

The current sensing resistor 50 may consist of a variable resistor.

The current sensing resistor 50 is connected to each of the switches 41, 42, 43, 44, 45 included in the switch unit 40. Thus, when currents flow through the switches, the current flowing through the current sensing resistor 50 is a sum of the currents flowing through the switches.

The operations of the switch unit 40, the current sensing resistor 50, and the resistor unit 35 according to this embodiment can be described with reference of the above description of FIG. 4.

Thus, according to the present invention, the resistor unit 35 is connected to the last end of the LED unit 30 and the voltage is distributed to the resistor unit 35. When a voltage equal to or greater than the rated voltage is inputted, the heat generated at the fifth switch 45 is distributed to the resistor unit 35, thereby preventing the fifth switch 45 from overheating. In this way, according to the present invention, when the input voltage equal to or greater than the rated voltage is inputted, some of the overheat generated at the switch unit 40 is distributed to the resistor unit 35 to be heated, thereby reducing the overheat at the switch unit 40 formed of the IC and providing the stability of the switch unit 40.

The current control unit 60 includes a temperature sensor.

The current control unit 60 measures temperature of the switch unit 40 by using a temperature sensor and controls the current flowing through the switch unit 40 according to the measured temperature of the switch unit 40.

In addition, the current control unit 60 may have a memory device, a normal operation temperature range for the switch unit 40 may be set.

The current control unit 60 measures temperature of the switch unit 40 by using the temperature sensor and controls the switches 41, 42, 43, 44, 45 of the switch unit 40 to control the current flowing through the switch unit 40 when the measured temperature of the switch unit 40 is deviated from the normal operation temperature range.

For example, when the normal operation temperature range set the current control unit 60 is from 0° C. to 80° C. and the measured temperature of the switch unit 40 is 85° C., the measured temperature of the switch unit 40 is deviated from the normal operation temperature range. In this case, the current control unit 60 changes a switch performing the operation (that is, current flows through the switch) among the switches 41, 42, 43, 44, 45 of the switch unit 40 to the off-state, and thus current does not flows through the switch unit 40.

Figure 28:
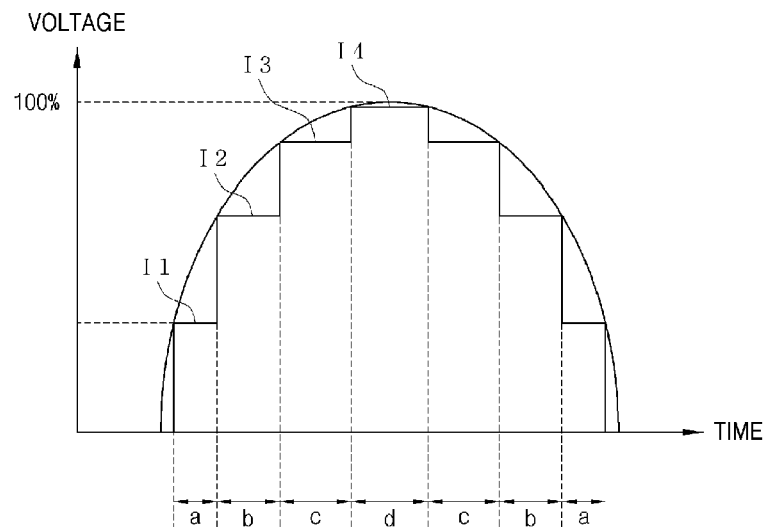
FIG. 28 is a diagram showing currents applied to the positions of LED channels according to an input voltage, according to some embodiment of the present invention.

FIG. 28 is a diagram showing currents applied to the positions of LED channels according to an input voltage, according to some embodiment of the present invention.

As described in FIG. 28, when a voltage equal to greater than the forward voltage Vf is inputted according to the input voltage, a saturation current flows through each of the LED channels 31, 32, 33, 34.

Section a in FIG. 28 is a section in which the input voltage operating the first LED channel 31 is inputted. Thus, in the section a, a current I1 flows through the first LED channel 31 and the first switch 41.

Section b is a section in which the input voltage operating the second LED channel 32 is inputted. Thus, in the section b, a current I2 flows through the second LED channel 32 and the second switch 42.

Section c is a section in which the input voltage operating the third LED channel 33 is inputted. Thus, in the section c, a current I3 flows through the third LED channel 33 and the third switch 43.

Section d is a section in which the input voltage operating the fourth LED channel 34 is inputted. Thus, in the section d, a current I4 flows through the fourth LED channel 34 and the fourth switch 44.

In FIG. 28, the section a is a section in which the first switch operates and then the first LED channel operates. The section b is a section in which the second switch operates and then the first LED channel and the second LED channel operate. The section c is a section in which the third switch operates and then the first LED channel, the second LED channel, and the third LED channel, operate. The section d is a section in which the fourth switch operates and then the first LED channel, the second LED channel, the third LED channel, and the fourth LED channel operate.

Herein, I4 is a current flowing through the switch control unit 40 when the input voltage to be inputted is almost 100% of the rated voltage. That is, a current flows through the fourth switch 44.

Herein, when the input voltage greater than the rated voltage is inputted (that is, greater than 100% of the rated voltage), the current I5 flows through the fifth switch 45.

In FIG. 28, the input voltage equal to or less than 100% of the rated voltage is inputted, the current flowing through the LED unit 30 and the switch control unit 40 is changed in a step functional manner according the input voltage, as shown in FIG. 28.

Figure 29:
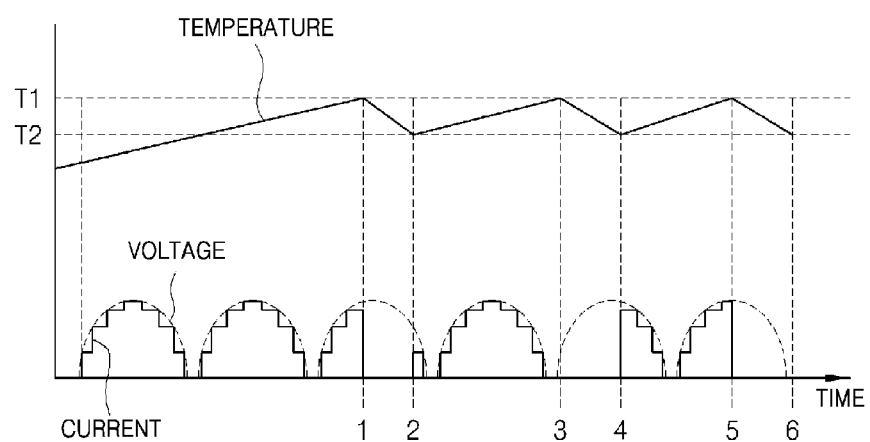
FIG. 29 is a diagram showing a temperature control of a switch control unit by controlling a current of a switch unit, according to some embodiment of the present invention.

FIG. 29 is a diagram showing temperature control of a switch control unit by controlling a current of a switch unit, according to some embodiment of the present invention.

The dotted lines of semicircles in the lower portion in FIG. 29 indicates the input voltage, and the solid lines in a step functional manner indicates the current of the switch unit 40 according to the input voltage.

In FIG. 28, since the LED channel to be operated is changed according to the section of the input voltage, as described above, the switch operating the LED channel is changed.

Except a voltage section in which the input voltage does not operate the first LED channel, currents always flow through the switch unit 40, and then the temperature in the switch unit 40 increases as time passes for inputting the input voltage passes.

However, when the temperature of the switch unit 40 continuously increases to reach a certain temperature, the switch unit 40 may be damaged or perform a malfunction due to heating.

Thus, according to the present invention, the temperature of the switch unit 40 is measured and the current flowing through the switch unit 40 is blocked to decrease the temperature of the switch unit 40 when the measured temperature is greater than normal operation temperature.

The method of decreasing the temperature by blocking the current, which flows through the switch unit 40 according to the temperature of the switch unit 40 with reference to FIG. 29 will be described.

First, the normal operation temperature of the switch unit is equal to or less than T2, and a malfunction temperature in which the switch unit malfunctions is T1. In addition, the malfunction temperature T1 is set in the current control unit 60.

When the input voltage is inputted in the LED unit 30 and a current flows through the switch unit 40, the temperature of the switch unit 40 increases, as shown in FIG. 29.

When the temperature of the switch unit 40 increases to be greater than the normal operation temperature T2 and reach the malfunction temperature T1, the current control unit 60 controls the switches through which a current flows among the switch control unit 40 to block the current. Then, when the temperature of the switch control unit 40 decreases to be lower than the normal operation temperature T2, the current control unit 60 controls a switch corresponding to the amount of the input voltage and makes a current flow, thereby operating a LED channel corresponding to the amount of the input voltage. Then, when the temperature of the switch unit 40 increases to be greater than the normal operation temperature T2 and reach the malfunction temperature T1, the current control unit 60 controls again the switches through which the current flows among the switch control unit 40 to block the current. Then, when the temperature of the switch control unit 40 decreases to be lower than the normal operation temperature T2, the current control unit 60 operates again a LED channel corresponding to the amount of the input voltage.

The operation of the current control unit 60 will be described with reference to FIG. 29.

When the input voltage is inputted and the temperature of the switch control unit 40 increases to reach the malfunction temperature T1 at a time 1, the current control unit 60 controls the third switch 43 through which a current I3 flows to block the current I3. Then, when the temperature of the switch control unit 40 decreases to reach the normal operation temperature T2 at a time 2, the current control unit 60 controls the first switch 41 corresponding to the input voltage to flow a current I1.

Then, when the temperature of the switch control unit 40 increases to reach the malfunction temperature T1 at a time 3, the current control unit 60 controls the first switch 41 to block the current I1. Then, when the temperature of the switch control unit 40 decreases to reach the normal operation temperature T2 at a time 4, the current control unit 60 controls the third switch 43 corresponding to the input voltage to flow a current I3.

Then, when the temperature of the switch control unit 40 increases to reach the malfunction temperature T1 at a time 5, the current control unit 60 controls the fourth switch 44 to block the current I4. Then, when the temperature of the switch control unit 40 decreases to reach the normal operation temperature T2 at a time 6, the current control unit 60 controls a switch corresponding to the input voltage to flow a corresponding current.

In addition, the present invention has distinguishable features according to the power consumption.

From the first switch to the fourth switch, when the input voltage increases, the $n^{th}$ switch is operated by the remained voltage formed by subtracting the forward voltage at the $n^{th}$ LED channel. When the more voltage is inputted, the $n^{th}$ switch becomes the off-state and the $(n+1)^{th}$ switch operates so as to increase the power consumption (heat generation). However, the total power consumption is within a specific system standard range. When a voltage equal to or greater than the rated voltage is inputted, an excessive current flows through the fifth switch 45 (the last switch), and then the power consumption (heat generation) becomes greater than the system standard range. Thus, when the voltage equal to or greater than the rated voltage is inputted, overheating occurs at the fifth switch 45.

According to the present invention, since the resistor unit 35 is included, heat can be generated at the resistor unit 35 when the voltage equal to or greater than the rated voltage is inputted, thereby reducing the heat generating at the fifth switch 45.

In addition, according to the present invention, the forward voltages Vf of the LED channels are unevenly redistributed, and then the power consumed at each switch becomes almost same. That is, the forward voltage Vf of the $(n+1)^{th}$ LED channel increases greater than the forward voltage Vf of the $n^{th}$ LED channel, and then the power consumption at the $n^{th}$ switch and the power consumption at the $(n+1)^{th}$ switch become almost same. By the redistribution of the forward voltages Vf of the LED channels, the heat generation at the switch unit 40 becomes same regardless of the change of the input voltage.

Herein, although the forward voltage Vf of each LED channel can be freely changed, the total amount of the forward voltages Vf is set as the maximum value of the input voltage.

The lighting device of the present invention described above has advantages as follows. A temperature sensor is included to measure the temperature of the switch unit formed of IC and to control the current flowing through the switch unit, thereby maintaining the temperature less than the malfunction temperature and protecting the switch unit. The FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

Figure 30:
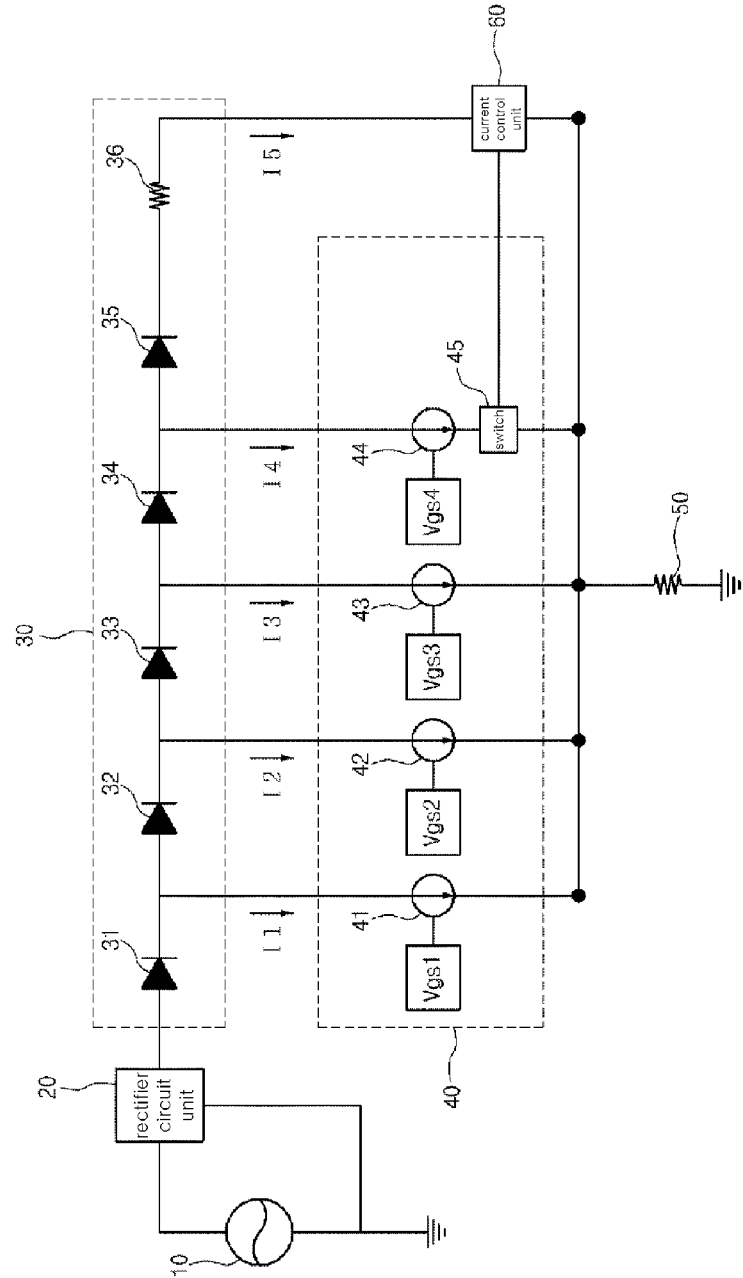
FIG. 30 is a diagram showing a structure of a LED lighting device protecting a switch unit by controlling a current of the switch unit, according to some embodiment of the present invention.

FIG. 30 is a diagram showing a structure of a LED lighting device protecting a switch unit by controlling a current of the switch unit, according to some embodiment of the present invention.

The LED lighting device protecting the switch unit by controlling a current of the present invention includes the power source unit 10, the rectifier circuit unit 20, the LED unit 30, the switch unit 40, the current sensing resistor 50, and the switch current blocking unit 60.

The power source unit 10 supplies the input power. The rectifier circuit unit 20 receives the AC input power from the power source unit 10, rectifies the input power, and outputs a rectified power.

The LED unit 30 includes n+1 LED channels connected in series. The resistor unit 36 is connected to the last end of the last LED channel 35.

Hereinafter, the present invention will be described with an assumption of n=4 for easy description.

In FIG. 30, the LED unit 30 includes 5 LED channels 31, 32, 33, 34, 35. The resistor unit 36 is connected in series to an end next to the last LED channel 35 among the LED channels connected each other in series.

The switch unit 40 includes 4 switches to operate the LED channels according to the input power source. Herein, the 4 switches, the first through fourth switches, controls the operations of the LED channels according to the input power source.

That is, the first switch 41 is connected to the first LED channel 31 and turns on to operate the first LED channel 31. The second switch 42 is connected to the second LED channel 32 and turns on to operate the first LED channel 31 and the second LED channel 32. The third switch 43 is connected to the third LED channel 33 and turns on to operate the first LED channel 31, the second LED channel 32, and third LED channel 33. The fourth switch 44 is connected to the fourth LED channel 34 and turns on to operate the first LED channel 31, the second LED channel 32, and third LED channel 33, and the fourth LED channel 34.

Herein, the last LED channel (that is, the fifth LED channel 35) is connected to the switch current blocking unit 60 through the resistor unit 36.

The switching operation of the switching circuit unit 40 will be described with reference to FIG. 30.

The second LED channel 32 and the first switch 41 are connected an end next to the first LED channel 31. The third LED channel 33 and the second switch 42 are connected an end next to the second LED channel 32. The fourth LED channel 34 and the third switch 43 are connected an end next to the third LED channel 33. The fifth LED channel 35 is connected an end next to the fourth LED channel 34. The resistor unit 36 is connected an end next to the fifth LED channel 35.

Herein, each switch in the switch unit 40 consists of a FET (Field Effect Transistor), for example, a NMOS FET.

The current sensing resistor 50 may consist of a variable resistor.

The current sensing resistor 50 is connected to each of the switches 41, 42, 43, 44 included in the switch unit 40. Thus, when currents flow through the switches, the amount of the current flowing through the current sensing resistor 50 is a sum of the currents flowing through the switches.

The operation of the switch unit 40 according to the present invention will be described.

Initially, the operation voltage is inputted to gates of all switches 41, 42, 43, 44 to operate each of the switch (that is, the current flows).

Herein, an operation voltage of the first switch 41 is Vgs1, an operation voltage of the second switch 42 is Vgs2, an operation voltage of the third switch 43 is Vgs3, and an operation voltage of the fourth switch 44 is Vgs4.

Herein, the condition of Vgs1<Vgs2<Vgs3<Vgs4 is satisfied.

Each of Vgs1, Vgs2, Vgs3, and Vgs4 is connected to the current sensing resistor 50 and affected by a voltage applied to the current sensing resistor 50.

Afterward, the switches in the switch unit 40 are automatically controlled by the voltage value applied to the current sensing resistor 50 according to the amount of the rectified voltage inputted in the LED unit 30, thereby operating the LED channels.

In the present invention, a switching condition means that when current flows two adjacent switches, a voltage is generated at the current sensing resistor by a sum of the currents flowing through the two adjacent switches, the operation voltage decreases due to the voltage applied to the current sensing resistor, and then any switch having a lower operation voltage first turns off.

Afterward, the switches in the switch unit 40 are automatically controlled by the voltage value applied to the current sensing resistor 50 according to the amount of the rectified voltage rectified at the rectifier circuit unit 20 and inputted in the LED unit 30, thereby operating the LED channels.

According to the present invention, for example, the current sensing resistor 50 is set for 10 ohm.

Table 3 shows saturation current values at the switches (FETs) and voltages applied to the current sensing resistor when the saturation current flows through switches.

Herein, "Id" indicates a saturation current of the corresponding switch. It indicates a saturation voltage when the switch operates and a current flows. "Vrs" indicates a voltage applied to the current sensing resistor.

TABLE 3

|  | Id (mA) | Vrs |
|---|---|---|
| First FET | 20 | 0.2 |
| Second FET | 40 | 0.4 |
| Third FET | 60 | 0.6 |
| Fourth FET | 80 | 0.8 |

In addition, a forward voltage Vf of each LED channel is 50V.

In this case, when an input voltage increases to reach about 50V, the first LED channel 31 begins to operate and a current I1 begins to flow through the first switch 41. When the input voltage is equal to or greater than 50V, a saturation current of 20 mA flows through the first switch 41 and the voltage applied to the current sensing resistor 50 becomes 0.2V.

When the input voltage increases to reach about 100V, the second LED channel 32 begins to operate and the current I2 gradually flows through the second switch 42. A current flowing through the current sensing resistor 50 is a sum of the currents flowing through the first switch 41 of 20 mA and the current I2 flowing through the second switch 42. Thus, the voltage at the current sensing resistor 50 gradually increases. As the voltage applied to the current sensing resistor 50 increases, the voltage Vgs1 inputted to the gate of the first switch 41 becomes relatively lower, and thus the first switch 41 gets into the switching condition in which an on-state changes to an off-state. When the input voltage gradually increases to gradually increase the current I2 flowing through the second switch 42, the voltage applied to the current sensing resistor 50 gradually increases to relatively lower the voltage value of Vgs1, and thus the first switch 41 becomes the off-state.

When the input voltage is equal to or greater than 100V, a saturation current of 40 mA flows through the second switch 42 and the first switch 41 is completely the off-state.

When the input voltage increases to reach about 150V, the third LED channel 33 begins to operate, a current I3 gradually flows through the third switch 43. Herein, a current flowing through the current sensing resistor 50 is a sum of the currents flowing through the second switch 42 of 40 mA and the current I3 flowing through the third switch 43. Thus, the voltage applied to the current sensing resistor 50 gradually increases. As the voltage applied to the current sensing resistor 50 increases, a voltage Vgs2 inputted to the gate of the second switch 42 becomes relatively lower, and thus the second switch 42 gets into the switching condition in which an on-state changes to an off-state. When the voltage value applied to the current sensing resistor 50 gradually increases to relatively lower the voltage value of Vgs2, and thus the second switch 42 becomes the off-state.

When the input voltage is equal to or greater than 150V, a saturation current of 60 mA flows through the third switch 43, and the second switch 42 becomes completely the off-state.

As described above, when a current sequentially flows through a $(m+1)^{th}$ switch according to the input voltage, a mth switch becomes the off-state.

When the input voltage increases to reach about 200V, the fourth LED channel 34 begins to operate, and the current I3 and the current I4 gradually flow through the third switch 43 and the fourth switch 44, respectively. Herein, a current flowing through the current sensing resistor 50 is a sum of the currents flowing through the third switch 43 of 60 mA and the currents flowing through the fourth switch 44 and the fifth switch 45. Likewise, when the input voltage is equal to or greater than 200V, a saturation current of 80 mA flows through the fourth switch 44, and the third switch 43 becomes completely the off-state.

Herein, when the rated voltage is 200V and the input voltage equal to or greater than the rated voltage is inputted, an over-current, which is greater than the current for the switch to perform the normal operation, flows through the fourth switch 44 to flow a excessive current through the switch, thereby generating a significant amount of heat at the switch. When the significant amount of heat is generated at the fourth switch 44, the switch unit 40 formed of a IC with a FET may be significantly damaged.

Thus, in the present invention, the fifth LED channel 35 and the resistor unit 36 are connected in series to an end next to the fourth LED channel 34. When the input voltage equal to or greater than the rated voltage is inputted, a current flows through the fifth LED channel 35 to the resistor unit 36, and then heat generated at the switch unit 40, when a voltage equal to or greater than the rated voltage inputted, is distributed to the resistor unit 36, thereby preventing the generation of excessive heat at the switch unit 40.

That is, according to the present invention, when the resistor unit 36 is connected to the last end of the LED unit 30, the voltage is distributed at the resistor unit 36 and a voltage equal to or greater than the rated voltage is inputted, the heat generated at the fourth switch 44 is distributed to the resistor unit 36, thereby preventing the fourth switch 44 from overheating. In this way, according to the present invention, when the input voltage equal to or greater than the rated voltage is inputted, the switch unit 40 is not overheated, thereby providing the stability of the switch unit 40 formed of the IC.

In addition, in the present invention, in order to prevent damage of the switch unit 40 by inputting the over-current to the switch unit 40 when a voltage equal to or greater than the rated voltage, and in order to prevent damages by the heating caused by continuous inputting the voltage equal to or greater than the rated voltage and caused by continuous inputting the over-current to the switch unit 40, the switch current blocking unit 60, which blocks the current flowing through the switch unit 40, is positioned outside of the switch unit 40.

The switch current blocking unit 60 senses the current flowing through the fifth LED channel 35 and the resistor unit 36, and controls the switch current blocking switch 45 positioned in the switch unit 40, when an over-current flows, to make the switch off, thereby blocking the current, which flows through the switch unit 40.

Herein, the switch current blocking unit 60 directly controls the fourth switch 44 through which the current flows in the switch unit 40 to turn the fourth switch 44 off and not to flow the current through the switch unit 40.

An over-current usually occurs at the last switch, that is, the fourth switch 44, but an over-current may occur at the first through the third switches caused by other reasons. The switch current blocking unit 60 may control all switches in the switch unit 40, and then block the current flowing through the switch unit 40 when an over-current flows through the switch unit 40.

for this purpose, a stable operation current value with which the switch unit 40 is stably operated is set in the switch current blocking unit 60. The switch current blocking unit 60 senses the current, compares it with the stable operation current value, and blocks the switch through which the current flows among the switches in the switch unit 40 when an over-current equal to or greater than the stable operation current value flows, to connect the internal switch between the resistor unit 35 and a ground voltage, thereby blocking the current, which flows through the switch unit 40.

For example, when the stable operation current value set in the switch current blocking unit 60 is 110 mA, a voltage equal to or greater than the rated voltage is inputted, and a current of equal to or greater than 110 mA flows through the switch current blocking unit 60, the switch current blocking unit 60 immediately turns off the switch through which the current flows in the switch unit 40, thereby blocking the current, which flows through the switch unit 40.

Figure 31:
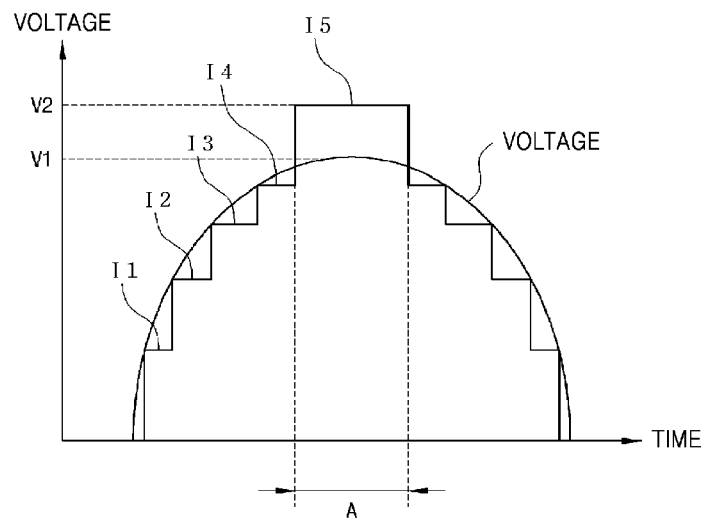
FIG. 31 is a diagram showing currents applied to the positions of LED channels according to an input voltage, according to some embodiment of the present invention.

FIG. 31 is a diagram showing currents applied to the positions of LED channels according to an input voltage, according to some embodiment of the present invention.

As described above, when voltage equal to or greater than the forward voltage Vf inputted to each of LED channels 31, 32, 33, 34 according to the input voltage, current flows.

In FIG. 31, "V1" indicates the maximum voltage within the rated voltage.

In FIG. 31, "I1" indicates a current flowing through the first LED channel 31. "I2" indicates a current flowing through the second LED channel 32. "I3" indicates a current flowing through the third LED channel 33. "I4" indicates a current flowing through the fourth LED channel 34.

As described above, when the input voltage is inputted within the rated voltage, the current flowing through the LED unit 30 is changed in the sequence of I1→I2→I3→I4→I1.

However, a voltage equal to or greater than the rated voltage is inputted, the fifth LED channel 35 operates to flow the current I5 through the LED unit 30.

In FIG. 31, "V2" indicates the maximum value of the voltage equal to or greater than the rated voltage. Section A is a section in which the voltage equal to or greater than the rated voltage is inputted.

That is, in the section A in which the input voltage equal to or greater than the rated voltage us inputted, the fifth LED channel 35 operates to flow the current through the resistor unit 36, and then the heat generated at the switch unit 40 is distributed, thereby preventing excessive heat generation at the switch unit 40.

Figure 32:
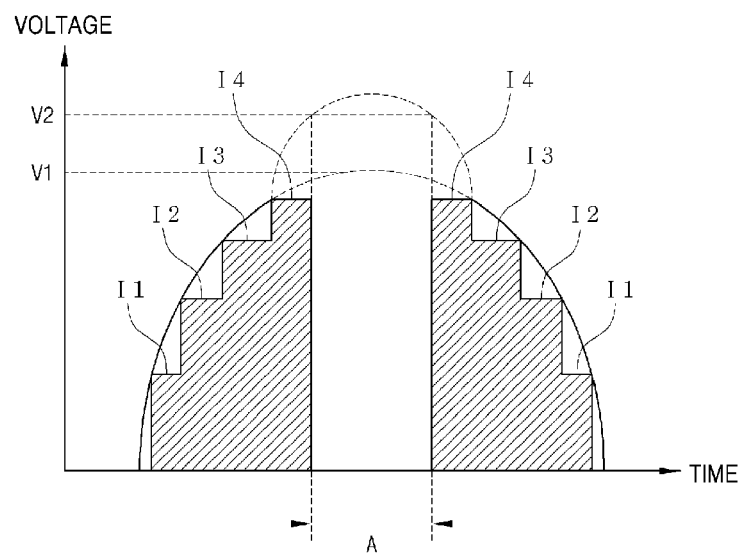
FIG. 32 is a diagram showing the blockage of a current flowing through a switch unit, when an input voltage equal to or greater than the rated voltage is inputted, according to some embodiment of the present invention.

FIG. 32 is a diagram showing the blockage of a current flowing through a switch unit, when an input voltage equal to or greater than the rated voltage is inputted, according to some embodiment of the present invention.

As described above, the switch current blocking unit 60 includes the stable operation current value, senses the current flowing through LED unit when a voltage equal to or greater than the rated voltage inputted, compares it with the stable operation current value, and then blocks the current flowing through the switch unit 40 when the current is greater than the stable operation current value.

In FIG. 32, the section A is a section in which a voltage equal to or greater than the rated voltage inputted. Herein, when the current flowing through the LED unit 30 and sensed the switch current blocking unit 60 is greater than the stable operation current value, the switch current blocking unit 60 controls the switch in the switch unit 40 to block the current flowing. In addition, when the input voltage is inputted within the rated voltage and the current flowing through the LED unit 30 is less than the stable operation current value, the switch current blocking unit 60 makes the last switch (that is, the fourth switch 44) from the off-state to the on-state, thereby flowing the current through the switch unit 40.

Thus, when the current flowing through the LED unit 30 and sensed by the switch current blocking unit 60 in the section A is greater than the stable operation current value, the current flows in switch unit 30 in only the hatching area shown in FIG. 32.

That is, in the section A in which the rated voltage damaging the switch unit 40 is inputted, a current does not flow through the switch unit 40.

In addition, the present invention has distinguishable features according to the power consumption.

From the first switch to the fourth switch, when the input voltage increases, the $n^{th}$ switch is operated by the remained voltage formed by subtracting the forward voltage at the $n^{th}$ LED channel. When the more voltage is inputted, the $n^{th}$ switch becomes the off-state and the $(n+1)^{th}$ switch operates so as to increase the power consumption (heat generation). However, the total power consumption is within a specific system standard range.

In addition, according to the present invention, the forward voltages Vf of the LED channels are unevenly redistributed, and then the power consumed at each switch becomes almost same. That is, the forward voltage Vf of the $(m+1)^{th}$ LED channel increases greater than the forward voltage Vf of the mth LED channel, and then the power consumption at the mth switch and the power consumption at the $(m+1)^{th}$ switch become almost same. By the redistribution of the forward voltages Vf of the LED channels, the heat generation at the switch unit 40 becomes same regardless of the change of the input voltage.

Herein, although the forward voltage Vf of each LED channel can be freely changed, the total amount of the forward voltages Vf is set as the maximum value of the input voltage.

The lighting device of the present invention described above has advantages as follows. Since the switch current blocking unit is included, when a voltage equal to or greater than the rated voltage is inputted to flow an over-current through the switch unit formed of IC, the current flowing through the switch unit is blocked, thereby protecting the switch unit. In addition, the FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

Figure 33:
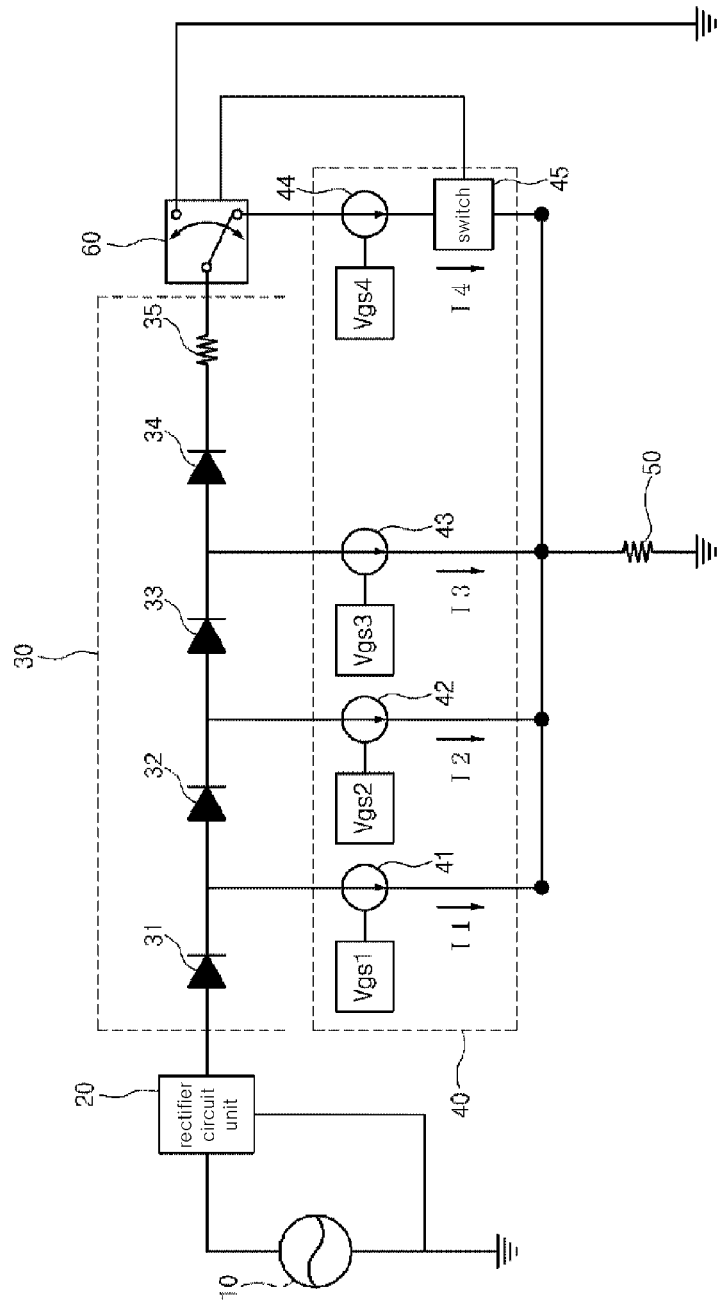
FIG. 33 is a diagram showing a structure of a LED lighting device protecting a switch unit by controlling a current, according to some embodiment of the present invention.

FIG. 33 is a diagram showing a structure of a LED lighting device protecting a switch unit by controlling a current, according to some embodiment of the present invention.

The LED lighting device protecting the switch unit through the current control of the present invention includes the power source unit 10, the rectifier circuit unit 20, the LED unit 30, the switch unit 40, the current sensing resistor 50, and current conversion switch 60.

The power source unit 10 supplies the input power. The rectifier circuit unit 20 receives the AC input power from the power source unit 10, rectifies the input power, and outputs a rectified power.

The LED unit 30 includes n LED channels connected in series. The resistor unit 36 is connected to the last end of the last LED channel 35.

Hereinafter, the present invention will be described with an assumption of n=4 for easy description.

In FIG. 33, the LED unit 30 includes 4 LED channels 31, 32, 33, 34. The resistor unit 35 is connected in series to an end next to the last LED channel 347 among the LED channels connected each other in series.

The current conversion switch 60 is connected between the resistor unit 35 and the last switch of the switch unit 40. In addition, the current conversion switch 60 is connected to a ground voltage to change the direction of the current according to the operation of the internal switch.

The switch unit 40 includes 4 switches to operate the LED channels according to the input power source. Herein, the 4 switches, the first through fourth switches, controls the operations of the LED channels according to the input power source.

That is, the first switch 41 is connected to the first LED channel 31 and turns on to operate the first LED channel 31. The second switch 42 is connected to the second LED channel 32 and turns on to operate the first LED channel 31 and the second LED channel 32. The third switch 43 is connected to the third LED channel 33 and turns on to operate the first LED channel 31, the second LED channel 32, and third LED channel 33.

The fourth switch 44 is connected to the fourth LED channel 34 through the resistor unit 35 and the current conversion switch 60 and turns on to operate the first LED channel 31, the second LED channel 32, and third LED channel 33, and the fourth LED channel 34. (Note that the switch of the current conversion switch 60 is connected to the fourth switch 44 of switch unit 60.)

The switching operation of the switching circuit unit 40 will be described with reference to FIG. 33.

The second LED channel 32 and the first switch 41 are connected an end next to the first LED channel 31. The third LED channel 33 and the second switch 42 are connected an end next to the second LED channel 32. The fourth LED channel 34 and the third switch 43 are connected an end next to the third LED channel 33. The fourth switch 44 is connected to the fourth LED channel 34 though the resistor unit 35 and the current conversion switch 60.

Herein, each switch in the switch unit 40 consists of a FET (Field Effect Transistor), for example, a NMOS FET.

The current sensing resistor 50 may consist of a variable resistor.

The current sensing resistor 50 is connected to each of the switches 41, 42, 43, 44 included in the switch unit 40. Thus, when currents flow through the switches, the amount of the current flowing through the current sensing resistor 50 is a sum of the currents flowing through the switches.

The operation of the switch unit 40 according to the present invention will be described.

Initially, an operation voltage is inputted to gates of all switches 41, 42, 43, 44 to operate each switch (that is, the current flows).

Herein, an operation voltage of the first switch 41 is Vgs1, an operation voltage of the second switch 42 is Vgs2, an operation voltage of the third switch 43 is Vgs3, and an operation voltage of the fourth switch 44 is Vgs4.

Herein, the condition of $Vgs1<Vgs2<Vgs3<Vgs4$ is satisfied.

Each of Vgs1, Vgs2, Vgs3, and Vgs4 is connected to the current sensing resistor 50 and affected by a voltage applied to the current sensing resistor 50.

Afterward, the switches in the switch unit 40 are automatically controlled by the voltage value applied to the current sensing resistor 50 according to the amount of the rectified voltage inputted in the LED unit 30, thereby operating the LED channels.

In the present invention, a switching condition means that when current flows two adjacent switches, a voltage is generated at the current sensing resistor by a sum of the currents flowing through the two adjacent switches, the operation voltage decreases due to the voltage applied to the current sensing resistor, and then any switch having a lower operation voltage first turns off.

Afterward, the switches in the switch unit 40 are automatically controlled by the voltage value applied to the current sensing resistor 50 according to the amount of the rectified voltage rectified at the rectifier circuit unit 20 and inputted in the LED unit 30, thereby operating the LED channels.

According to the present invention, for example, the current sensing resistor 50 is set for 10 ohm.

Table 4 shows saturation current values at the switches (FETs) and voltages applied to the current sensing resistor when the saturation current flows through switches.

Herein, "Id" indicates a saturation current of the corresponding switch. It indicates a saturation voltage when the switch operates and a current flows. "Vrs" indicates a voltage applied to the current sensing resistor.

TABLE 4

|  | Id (mA) | Vrs |
|---|---|---|
| First FET | 20 | 0.2 |
| Second FET | 40 | 0.4 |
| Third FET | 60 | 0.6 |
| Fourth FET | 80 | 0.8 |

In addition, a forward voltage Vf of each LED channel is 50V.

In this case, when an input voltage increases to reach about 50V, the first LED channel 31 begins to operate and a current I1 begins to flow through the first switch 41. When the input voltage is equal to or greater than 50V, a saturation current of 20 mA flows through the first switch 41 and the voltage applied to the current sensing resistor 50 becomes 0.2V.

When the input voltage increases to reach about 100V, the second LED channel 32 begins to operate and the current I2 begins to flow through the second switch 42. A current flowing through the current sensing resistor 50 is a sum of the currents flowing through the first switch 41 of 20 mA and the current I2 flowing through the second switch 42. Thus, the voltage at the current sensing resistor 50 gradually increases. As the voltage applied to the current sensing resistor 50 increases, the voltage Vgs1 inputted to the gate of the first switch 41 becomes relatively lower, and thus the first switch 41 gets into the switching condition in which an on-state changes to an off-state. When the input voltage gradually increases to gradually increase the current I2 flowing through the second switch 42, the voltage applied to the current sensing resistor 50 gradually increases to relatively lower the voltage value of Vgs1, and thus the first switch 41 becomes the off-state.

When the input voltage is equal to or greater than 100V, a saturation current of 40 mA flows through the second switch 42 and the first switch 41 is completely the off-state.

When the input voltage increases to reach about 150V, the third LED channel 33 operates, a current I3 gradually flows through the third switch 43. Herein, a current flowing through the current sensing resistor 50 is a sum of the currents flowing through the second switch 42 of 40 mA and the current I3 flowing through the third switch 43. Thus, the voltage applied to the current sensing resistor 50 gradually increases. As the voltage applied to the current sensing resistor 50 increases, a voltage Vgs2 inputted to the gate of the second switch 42 becomes relatively lower, and thus the second switch 42 gets into the switching condition in which an on-state changes to an off-state. When the voltage value inputted to the current sensing resistor 50 gradually increases to relatively lower the voltage value of Vgs2, and thus the second switch 42 becomes the off-state.

When the input voltage is equal to or greater than 150V, the saturation current of 60 mA flows through the third switch 43, and the second switch 42 becomes completely the off-state.

As described above, when a current sequentially flows through a $(m+1)^{th}$ switch according to the input voltage, a mth switch becomes the off-state.

When the input voltage increases to reach about 200V, the fourth LED channel 34 begins to operate, and the current I3 and the current I4 gradually flow through the third switch 43 and the fourth switch 44, respectively. Herein, a current flowing through the current sensing resistor 50 is a sum of the currents flowing through the third switch 43 of 60 mA and the currents flowing through the fourth switch 44 and the fifth switch 45. Likewise, when the input voltage is equal to or greater than 200V, the saturation current of 80 mA flows through the fourth switch 44, and the third switch 43 becomes completely the off-state.

Herein, when the rated voltage is 200V and the input voltage equal to or greater than the rated voltage is inputted, an over-current, which is greater than the current for the switch to perform the normal operation, flows through the fourth switch 44 to flow a excessive current through the switch, thereby generating a significant amount of heat at the switch. When the significant amount of heat is generated at the fourth switch 44, the switch unit 40 formed of a IC with a FET may be significantly damaged.

Thus, in the present invention, the fifth LED channel 35 and the resistor unit 35 are connected in series to an end next to the fourth LED channel 34. When the input voltage equal to or greater than the rated voltage is inputted, a current flows through the fifth LED channel 35 to the resistor unit 35, and then heat generated at the switch unit 40, when a voltage equal to or greater than the rated voltage inputted, is distributed to the resistor unit 35, thereby preventing the generation of excessive heat at the switch unit 40.

That is, according to the present invention, when the resistor unit 35 is connected to the last end of the LED unit 30, the voltage is distributed at the resistor unit 35 and a voltage equal to or greater than the rated voltage is inputted, the heat generated at the fourth switch 44 is distributed to the resistor unit 35, thereby preventing the fourth switch 44 from overheating. In this way, according to the present invention, when the input voltage equal to or greater than the rated voltage is inputted, the switch unit 40 is not overheated, thereby providing the stability of the switch unit 40 formed of the IC.

In addition, in the present invention, in order to prevent damage of the switch unit 40 by inputting the over-current to the switch unit 40 when a voltage equal to or greater than the rated voltage, and in order to prevent damages by the heating caused by continuous inputting the voltage equal to or greater than the rated voltage and caused by continuous inputting the over-current to the switch unit 40, the switch current blocking unit 60, which blocks the current flowing through the switch unit 40, is positioned outside of the switch unit 40.

The current blocking control unit 45 is positioned between the current conversion switch 60 and the fourth switch 44. Otherwise, the current blocking control unit 45 is positioned between the fourth switch 44 and the current sensing resistor 50, as shown in FIG. 33.

In addition, the current blocking control unit 45 may be positioned in the switch unit 40 or outside of the switch unit 40 between the switch unit 40 and the current sensing resistor 50.

The current blocking control unit 45 senses the current flowing through the fourth switch 44, compares it with the stable operation current value, and controls the current conversion switch 60 when an over-current equal to or greater than the stable operation current value flows, to connect the internal switch between the resistor unit 35 and a ground voltage, thereby blocking the current, which flows through the switch unit 40.

Herein, the stable operation current value may be set in the current blocking control unit 45. Otherwise, the stable operation current value may be set an additional memory outside of the switch unit 40. The current value flowing through the current blocking control unit 45 is sensed. When the current value is greater than the stable operation current value, the current conversion switch 60 is controlled, thereby blocking the current, which flows through the switch unit 40.

The blockage of current of the switch unit 40, when the input voltage equal to or greater than the rated voltage is inputted and the over-current flows through the switch unit 40 will be described in details with reference to FIG. 36.

Figure 34:
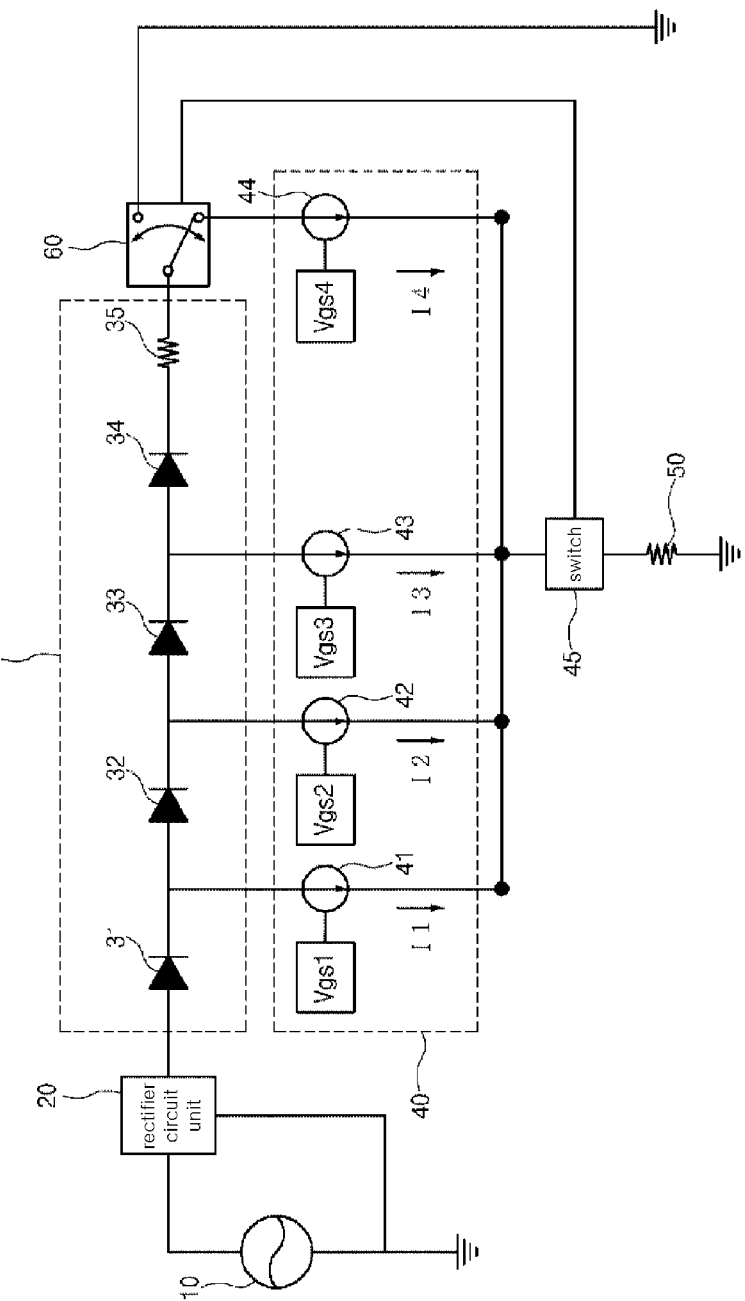
FIG. 34 is a diagram showing a current blocking control unit positioned between a switch unit and a current sensing resistor, according to some embodiment of the present invention.

FIG. 34 is a diagram showing a current blocking control unit positioned between a switch unit and a current sensing resistor, according to some embodiment of the present invention.

The current blocking control unit 45 is positioned between the switch unit 40 and the current sensing resistor 50, as shown in FIG. 34.

When the current blocking control unit 45 is positioned outside of the switch unit 40, a stable operation current value with which the switch unit 40 is stably operated is set in the current blocking control unit 45. For this purpose, the current blocking control unit 45 may further have a memory.

The current blocking control unit 45 senses the current flowing through the fourth switch 44, compares it with the stable operation current value, and controls the current conversion switch 60 when an over-current equal to or greater than the stable operation current value flows, thereby blocking the current, which flows through the switch unit 40.

An over-current usually occurs at the last switch, that is, the fourth switch 44, but an over-current may occur at the first through the third switches due to other reasons. When the current blocking control unit 45 is positioned between the switch unit 40 and the current sensing resistor 50, as shown in FIG. 34, the current blocking control unit 45 may sense and monitor all current value at all switches of the switch unit 40.

Figure 35:
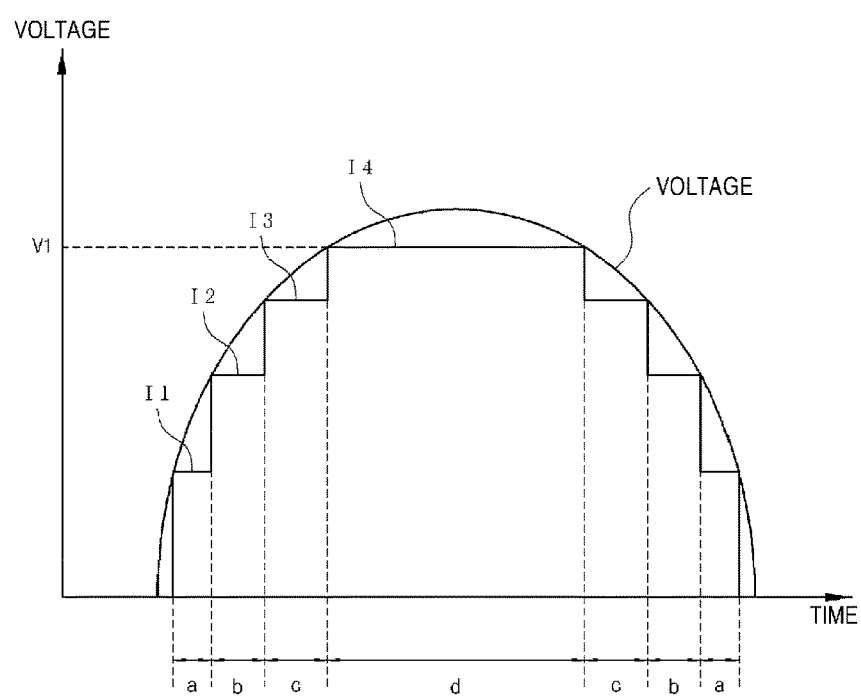
FIG. 35 is a diagram showing currents applied to the positions of LED channels according to an input voltage, according to some embodiment of the present invention.

FIG. 35 is a diagram showing currents applied to the positions of LED channels according to an input voltage, according to some embodiment of the present invention.

As described in FIG. 33, when a voltage equal to greater than the forward voltage Vf is inputted according to the input voltage, a saturation current flows through each of the LED channels 31, 32, 33, 34.

Section a in FIG. 35 is a section in which the input voltage operating the first LED channel 31 is inputted. Thus, in the section a, a current I1 flows through the first LED channel 31 and the first switch 41.

Section b is a section in which the input voltage operating the second LED channel 32 is inputted. Thus, in the section b, a current I2 flows through the second LED channel 32 and the second switch 42.

Section c is a section in which the input voltage operating the third LED channel 33 is inputted. Thus, in the section c, a current I3 flows through the third LED channel 33 and the third switch 43.

Section d is a section in which the input voltage operating the fourth LED channel 34 is inputted. Thus, in the section d, a current I4 flows through the fourth LED channel 34 and the fourth switch 44.

In FIG. 35, the section a is a section in which the first switch operates and then the first LED channel operates. The section b is a section in which the second switch operates and then the first LED channel and the second LED channel operate. The section c is a section in which the third switch operates and then the first LED channel, the second LED channel, and the third LED channel operate. The section d is a section in which the fourth switch operates and then the first LED channel, the second LED channel, the third LED channel, and the fourth LED channel operate.

Figure 36:
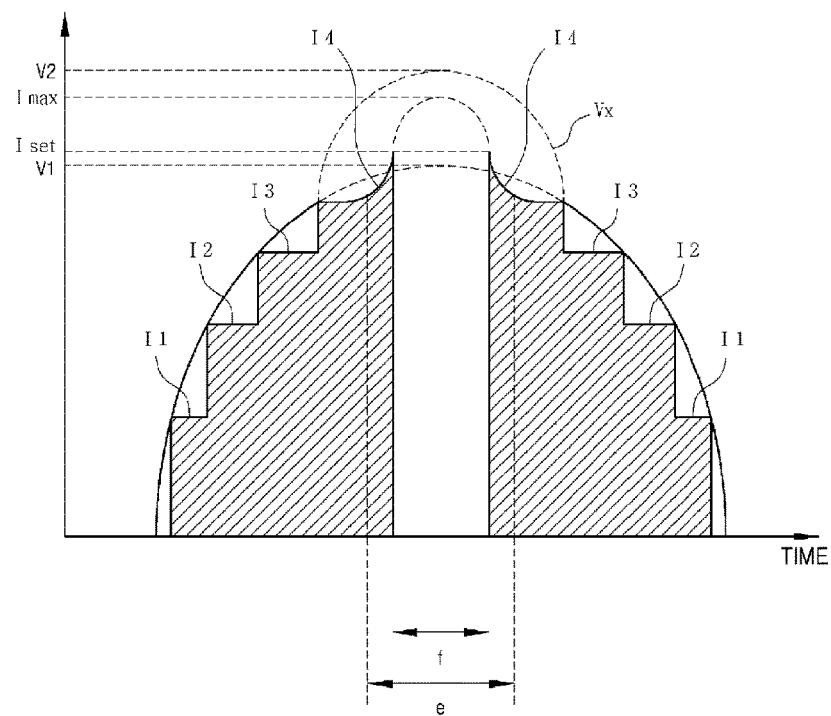
FIG. 36 is a diagram showing the blockage of a current flowing through a switch unit, when an input voltage equal to or greater than the rated voltage is inputted, according to some embodiment of the present invention.

FIG. 36 is a diagram showing the blockage of a current flowing through a switch unit, when an input voltage equal to or greater than the rated voltage is inputted, according to some embodiment of the present invention.

As described above, the current blocking control unit 45 senses the over-current flowing through switch unit 40, compares it with the stable operation current value, and then control the current conversion switch 60 to blocks the current flowing through the switch unit 40 when the over-current current is greater than the stable operation current value.

This operation will described with reference to FIG. 36.

First, "V1" indicates the maximum voltage within the rated voltage. "V2" indicates the maximum voltage outside of the rated voltage. "Vx" indicates the input voltage equal to or greater than the rated voltage. "Iset" indicates the stable operation current value. Imax indicates the current value flowing through the LED unit 30 when the input voltage is V2.

When the input voltage is inputted within the rated voltage, the current flowing through the switch unit 40 changes in the sequence of I1→I2→I3→I4→I1 to perform the operation, as shown in FIG. 35.

However, the input voltage is inputted outside of the rated voltage, that is Vx (a voltage between V1 and V2), the current flowing through the fourth switch 44 increases as shown in FIG. 36.

The increasing current I4 reaches the stable operation current value Iset, the current blocking control unit 45 controls the current conversion switch 60, thereby blocking the current, which flows through the switch unit 40. Thus, in the switch unit 40, the current increases during a range, the section e subtracted by the section f, the current does not flow in the switch unit 40 during the section f.

In FIG. 36, the case when the input voltage equal to or greater than the rated voltage is inputted, the current flowing through the switch unit 40 corresponds to the hatching area. As shown in FIG. 36, the current does not flow through the switch unit 40 in the section f.

When the voltage Vx decreases and the current flowing through the LED unit 30 decreases to be lower than Iset, the current blocking control unit 45 controls the current conversion switch 60 to flow the current through the switch unit 40.

In addition, the present invention has distinguishable features according to the power consumption.

From the first switch to the fourth switch, when the input voltage increases, the $n^{th}$ switch is operated by the remained voltage formed by subtracting the forward voltage at the $n^{th}$ LED channel. When the more voltage is inputted, the $n^{th}$ switch becomes the off-state and the $(n+1)^{th}$ switch operates so as to increase the power consumption (heat generation). However, the total power consumption is within a specific system standard range.

In addition, according to the present invention, the forward voltages Vf of the LED channels are unevenly redistributed, and then the power consumed at each switch becomes almost same. That is, the forward voltage Vf of the $(m+1)^{th}$ LED channel increases greater than the forward voltage Vf of the mth LED channel, and then the power consumption at the mth switch and the power consumption at the $(m+1)^{th}$ switch become almost same. By the redistribution of the forward voltages Vf of the LED channels, the heat generation at the switch unit 40 becomes same regardless of the change of the input voltage.

Herein, although the forward voltage Vf of each LED channel can be freely changed, the total amount of the forward voltages Vf is set as the maximum value of the input voltage.

The lighting device of the present invention described above has advantages as follows. Since the switch current blocking unit is included, when a voltage equal to or greater than the rated voltage is inputted to flow an over-current through the switch unit formed of IC, the current flowing through the switch unit is blocked, thereby protecting the switch unit. In addition, the FET switches can be automatically switched according to the input voltage without any input voltage sensing circuit or any input period sensing circuit. In addition, since the switch unit can be simply formed, additional LED channels can be added in the same area. In addition, since the forward voltage Vf at each LED channel can be controlled and redistributed, the efficiency of the switch unit increases and the combination of LEDs can be freely performed.

While the present invention has been particularly shown and described with reference to preferred embodiments thereof, it will be understood by those skilled in the art that various changes in form and details may be made therein without departing from the sprit and scope of the invention as defined by the appended claims. Therefore, the scope of the invention is defined not by the detailed description of the invention but by the appended claims, and all differences within the scope will be construed as being included in the present invention.

The invention claimed is:

1. A light emitting diode (LED) lighting device, comprising:
   a rectifier circuit unit for receiving input power from a power source unit and outputting a rectified power;
   a charge storage circuit unit, receiving power from the rectifier circuit unit, storing charges at a high voltage, and outputting the stored charges at low voltage;
   an LED unit having a plurality of LED channels and a resistor channel connected in series;
   a dimming control unit comprising a variable resistor for controlling the current flowing through the LED unit to control dimming of the LED channel; and
   a switch circuit unit comprising a plurality of switches, wherein an $N^{th}$ switch is connected to the rear end of an $N^{th}$ LED channel so as to control an operation of the $N^{th}$ LED channel, and is controlled by a sum of a current of the $N^{th}$ switch and a current of an $(N+1)^{th}$ switch, which flows through the variable resistor,
   wherein N is a positive integer, wherein the $(N+1)^{th}$ switch is connected to the resistor channel, and
   wherein the variable resistor is connected to each of the plurality of switches in the switch circuit unit.

2. The LED lighting device of claim 1, wherein the dimming control unit further comprises a dimming control switch, wherein the dimming control unit performs dimming control by changing the resistance value of the variable resistor with the switch to control the operating number of the LED channel of the LED unit.

3. The LED lighting device of claim 1, wherein the dimming control unit further comprises a dimming control switch, wherein the dimming control unit performs dimming control by changing the resistance value of the variable resistor with the switch to control the current value flowing through the LED channel of the LED unit.

4. The LED lighting device of claim 1,
   wherein the charge storage circuit unit comprises a first condenser, a second condenser, a first diode, a second diode, and a third diode,
   wherein the second diode is connected in a forward direction between the first condenser and the second condenser, an end of the first condenser is connected to a power source voltage node of the rectifier circuit unit, an end of the second condenser is connected to a ground, the first diode is connected in a backward direction between a ground and a node to which the first condenser and the second diode are connected, and the third diode is connected between the LED unit and a node to which the second condenser and the second diode are connected, and
   wherein, when a voltage outputted from the rectifier circuit unit is lower than a voltage stored in the charge storage circuit unit, the charge storage circuit unit outputs the stored charges to supply a voltage to the LED unit.

5. A light emitting diode (LED) lighting device, comprising:
   a rectifier circuit for receiving an input power from a power source unit and outputting a rectified power;
   an LED unit having a plurality of LED channels and a resistor channel connected in series, the plurality of LED channels comprising a first LED channel, a second LED channel and a $N^{th}$ LED channel, wherein N is a positive integer and each LED channel includes a front part and a rear part;
   a variable resistor; and
   a switch circuit unit comprising a plurality of switches, wherein an $N^{th}$ switch is connected to the rear end of an $N^{th}$ LED channel so as to control an operation of the $N^{th}$ LED channel, and is controlled by a sum of a current of the $N^{th}$ switch and a current of an $(N+1)^{th}$ switch, which flows through the variable resistor,
   wherein the $(N+1)^{th}$ switch is connected to the resistor channel, and
   wherein the LED unit comprises capacitors, each connected in parallel to each of the LED channels.

6. The LED lighting device of claim 5, wherein the capacitor supplies a voltage to the LED channel connected in parallel, when the input voltage is inputted as a voltage with which the LED channels connected in parallel are not operated.

7. The LED lighting device of claim 5, wherein each capacitor being disposed between the rectifier circuit and each LED channel and being connected to each LED channel in a parallel configuration to prevent a flicker phenomenon.

8. The LED lighting device of claim 5, wherein the plurality of LED units each formed as blocks which are connected in parallel.

9. The LED lighting device of claim 5, wherein the LED unit further comprises a resistor connected to a last end of the LED channels and configured to decrease heat generated at the switch circuit unit, and wherein N is a positive integer.

10. The LED lighting device of claim 5, wherein the forward voltage of the $(N+1)^{th}$ LED channel is greater than the forward voltage of the $N^{th}$ LED channel.

11. The LED lighting device of claim 5, wherein the LED channel comprises one or more LEDs.

12. The LED lighting device of claim 5, further comprising a plurality of LED operation units, wherein the plurality of LED operation units are connected each other in series to provide more brightness at a specific input voltage or more, compared with using one LED operation unit.

13. The LED lighting device of claim 5, wherein the LED unit is formed as blocks and the LED lighting device has a matrix connection structure, the LED lighting device further comprising a blocks connection unit to form a specific connection structure when the LED unit formed as the blocks are parallel.

14. The LED lighting device of claim 5, wherein the LED channel is formed as a block having one or more LEDs.

15. The LED lighting device of claim 5, further comprising:
   a current control unit comprising a temperature sensor, which measures temperature of the switch circuit unit, and controlling a current flowing through the switch circuit unit according to the temperature of the switch circuit unit.

16. The LED lighting device of claim 5, further comprising:
   a current conversion switch positioned between the resistor unit and the last switch for blocking the current, which flows through the switch circuit unit; and
   a current blocking control unit for controlling the current conversion switch, when an over-current flows through the switch circuit unit, to block the current flowing through the switch circuit unit.

17. A light emitting diode (LED) lighting device, comprising:
a rectifier circuit for receiving an input power from a power source unit and outputting a rectified power;
an LED unit having a plurality of LED channels and a resistor channel connected in series, the plurality of LED channels comprising a first LED channel, a second LED channel and a $N^{th}$ LED channel, wherein N is a positive integer and each LED channel includes a front part and a rear part;
a variable resistor; and
a switch circuit unit comprising a plurality of switches, wherein an $N^{th}$ switch is connected to the rear end of an $N^{th}$ LED channel so as to control an operation of the $N^{th}$ LED channel, and is controlled by a sum of a current of the $N^{th}$ switch and a current of an $(N+1)^{th}$ switch, which flows through the variable resistor, wherein the $(N+1)^{th}$ switch is connected to the resistor channel, and wherein variable resistor value of the variable resistor is decreased to increase the number of operating LED channels, causing the lighting device to become bright.

18. The LED lighting device of claim 17, wherein the variable resistor value is increased to decrease the number of operating LED channels, causing the lighting device to become weak.

19. The LED lighting device of claim 17, wherein a dimming control is performed by controlling the resistance value of the variable resistor.

20. The LED lighting device of claim 19, wherein a dimming control is performed by controlling the current value flowing through the $n^{th}$ switch, and then changing the current value flowing through the LED channel to be operated through the $N^{th}$ switch.

* * * * *